US012092764B2

(12) United States Patent
Loya et al.

(10) Patent No.: US 12,092,764 B2
(45) Date of Patent: Sep. 17, 2024

(54) ROTATION ANGLE SENSING AND CONTROL OF MIRROR ASSEMBLY FOR LIGHT STEERING

(71) Applicant: Beijing Voyager Technology Co., Ltd., Beijing (CN)

(72) Inventors: Sergio Fabian Almeida Loya, Mountain View, CA (US); Youmin Wang, Mountain View, CA (US)

(73) Assignee: Beijing Voyager Technology Co., Ltd., Beijing (CN)

( * ) Notice: Subject to any disclaimer, the term of this patent is extended or adjusted under 35 U.S.C. 154(b) by 938 days.

(21) Appl. No.: 17/133,364

(22) Filed: Dec. 23, 2020

(65) Prior Publication Data

US 2022/0196806 A1    Jun. 23, 2022

(51) Int. Cl.
| | |
|---|---|
| *G01S 7/481* | (2006.01) |
| *G01S 7/497* | (2006.01) |
| *G01S 17/08* | (2006.01) |
| *G02B 26/08* | (2006.01) |

(52) U.S. Cl.
CPC ............ *G01S 7/4817* (2013.01); *G01S 7/497* (2013.01); *G01S 17/08* (2013.01); *G02B 26/0833* (2013.01)

(58) Field of Classification Search
CPC ........ G01S 7/4817; G01S 17/08; G01S 7/497; G02B 26/0833; G02B 26/101
USPC ........................................................ 356/4.01
See application file for complete search history.

(56) References Cited

U.S. PATENT DOCUMENTS 10,422,881 B1 *    9/2019    Wang .................... G01S 17/931

* cited by examiner

*Primary Examiner* — Daniel L Murphy
(74) *Attorney, Agent, or Firm* — Kilpatrick Townsend & Stockton LLP

(57) ABSTRACT

In one example, a light detection and ranging (LiDAR) module is provided. The LiDAR module includes a microelectromechanical system (MEMS), a substrate on which the MEMS is formed, and one or more measurement circuits. The MEMS includes an array of micro-mirror assemblies. One or more micro-mirror assemblies of the array of micro-mirror assemblies further includes a measurement structure connected to the micro-mirror, an electrical resistance of the measurement structure being variable based on a rotation angle of the micro-mirror. The one or more measurement circuits are configured to: determine the electrical resistance of the measurement structure of the one or more micro-mirror assemblies; and provide the determined electrical resistance to enable measurement of a rotation angle of the micro-mirror of the one or more micro-mirror assemblies.

20 Claims, 20 Drawing Sheets

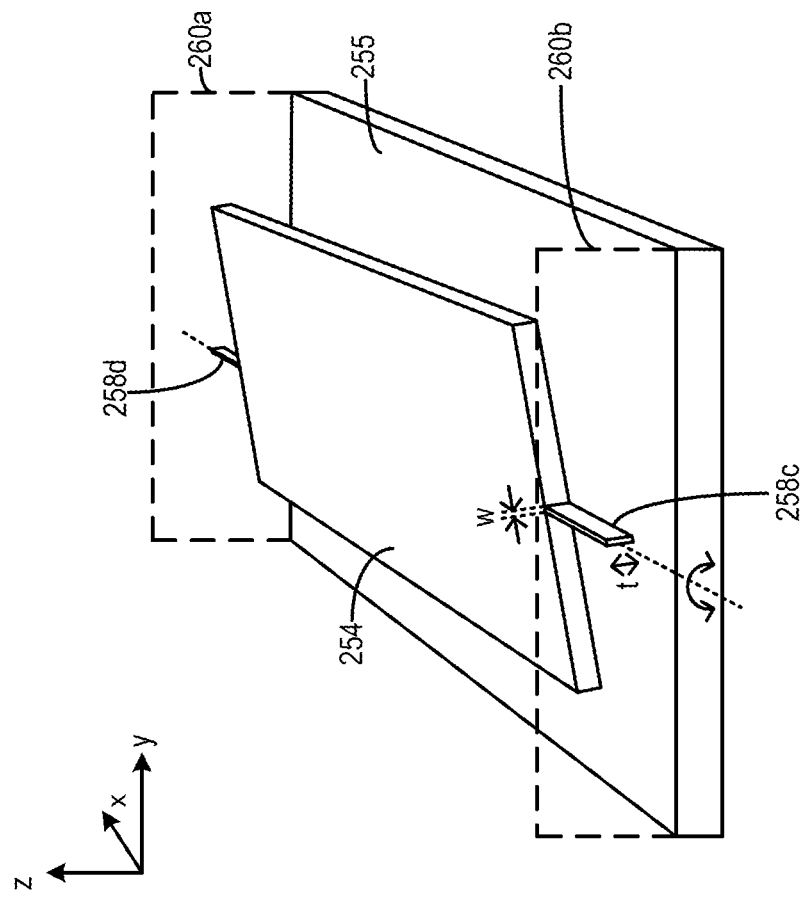
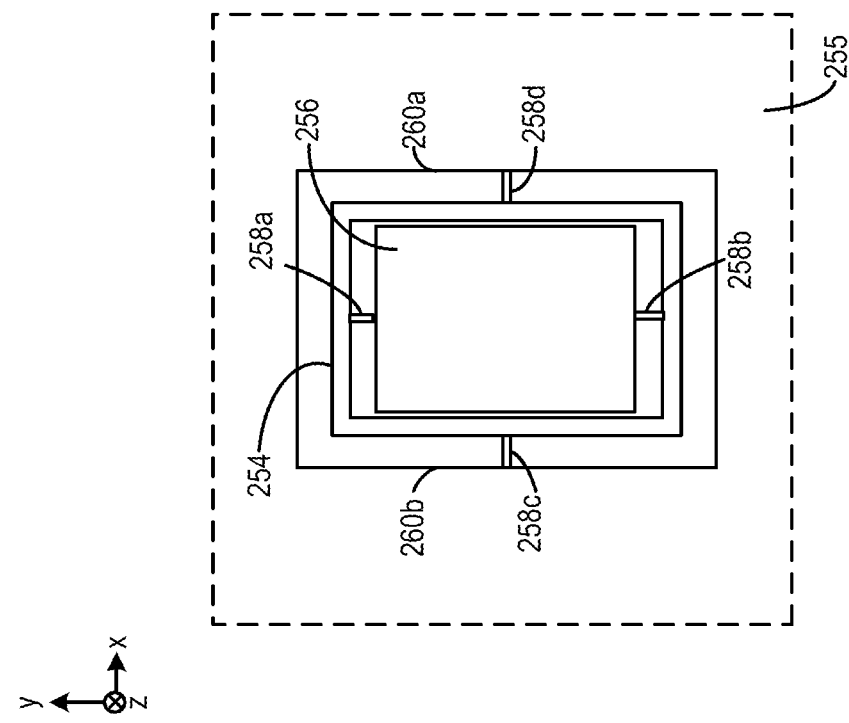
FIG. 2D

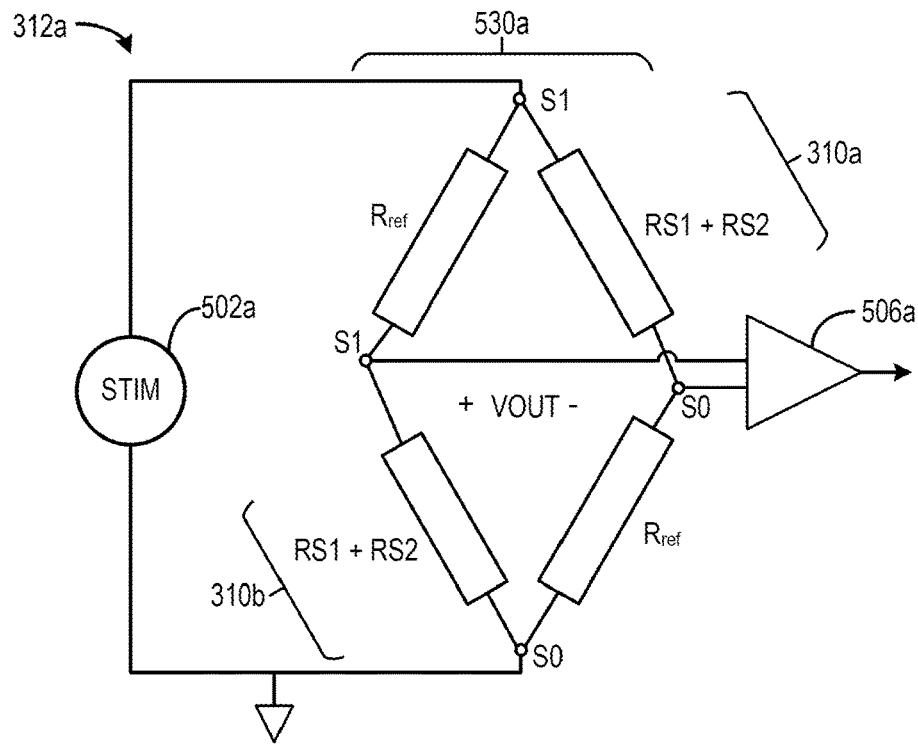
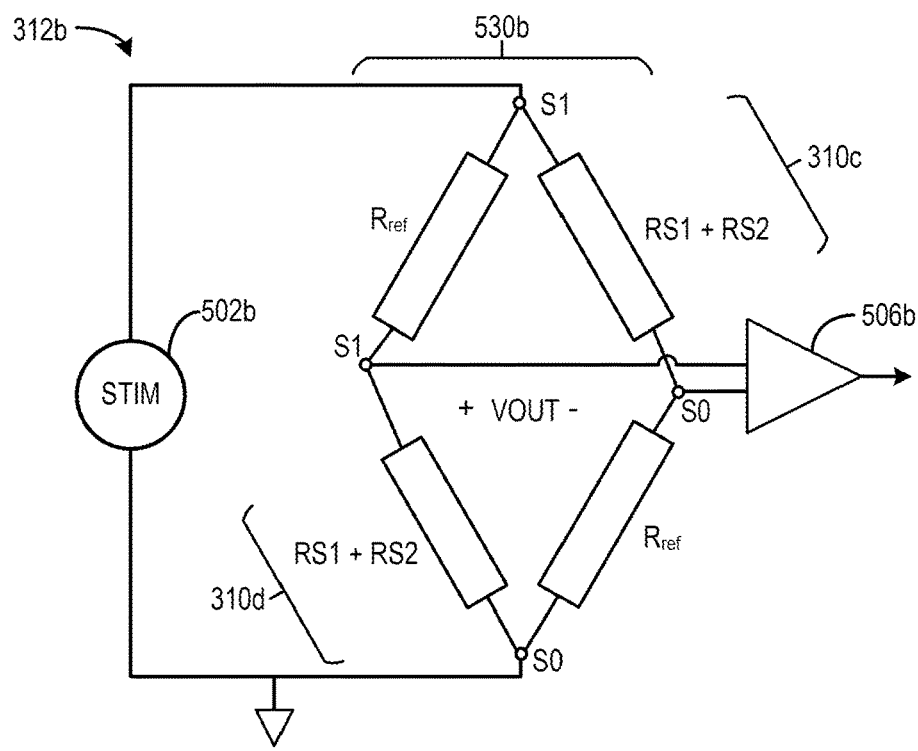
FIG. 5C

600 ⇘

602 — Determining a first signal based on a target rotation angle of a micro-mirror of one or more micro-mirror assemblies of an array of micro-mirror assemblies, the array of micro-mirror assemblies being part of an MEMS implemented on a substrate, the micro-mirror comprising a first connection structure and a second connection structure, the first connection structure being connected to the substrate at a first pivot point, the second connection structure being connected to the substrate at a second pivot point, the one or more micro-mirror assemblies of the array of micro-mirror assemblies further including a measurement structure connected to the micro-mirror, an electrical resistance of the measurement structure being variable based on a rotation angle of the micro-mirror

604 — Transmitting the first signal to the actuator of the micro-mirror assembly

606 — Obtaining, from one or more measurement circuits, measurements of the electrical resistance of the measurement structure of the one or more micro-mirror assemblies to determine a rotation angle of the micro-mirror of the one or more micro-mirror assemblies in response to the first signal.

FIG. 6

ROTATION ANGLE SENSING AND CONTROL OF MIRROR ASSEMBLY FOR LIGHT STEERING

BACKGROUND

Light steering typically involves the projection of light in a predetermined direction to facilitate, for example, the detection and ranging of an object, the illumination and scanning of an object, or the like. Light steering can be used in many different fields of applications, including, for example, autonomous vehicles and medical diagnostic devices.

Light steering can be performed in both transmission and reception of light. For example, a light steering system may include a micro-mirror array to control the projection direction of light to detect/image an object. Moreover, a light steering receiver may also include a micro-mirror array to select a direction of incident light to be detected by the receiver to avoid detecting other unwanted signals. The micro-mirror array may include an array of micro-mirror assemblies, with each micro-mirror assembly comprising a micro-mirror and an actuator. In a micro-mirror assembly, a micro-mirror can be connected to a substrate via a connection structure (e.g., a torsion bar, a spring) to form a pivot, and the micro-mirror can be rotated around the pivot by the actuator. Each micro-mirror can be rotated by a rotation angle to reflect (and steer) light from a light source towards a target direction. Each micro-mirror can be rotated by the actuator to provide a first range of angles of projection along a vertical axis and to provide a second range of angles of projection along a horizontal axis. The first range and the second range of angles of projection can define a two-dimensional field of view (FOV) in which light is to be projected to detect/scan an object. The FOV can also define the direction of incident lights, reflected by the object, to be detected by the receiver.

Ideally, all micro-mirror assemblies of a micro-mirror array are identical, and the micro-mirror in each micro-mirror assembly can be controlled to rotate uniformly by a target rotation angle in response to a control signal. However, due to variations in the fabrication process, as well as other non-idealities, the control precision of the micro-mirror may become degraded, such that a micro-mirror of a micro-mirror assembly may not rotate by the exact target rotation angle in response to the control signal. Moreover, different micro-mirrors of the micro-mirror array may rotate by different angles in response to the same control signal. All these can degrade the uniformity of the rotations among the micro-mirrors. Therefore, it is desirable to improve the control precision of the micro-mirror to improve the uniformity of rotations among the micro-mirrors.

BRIEF SUMMARY

In some examples, an apparatus is provided. The apparatus comprises a light detection and ranging (LiDAR) module. The LiDAR module includes: a semiconductor integrated circuit, the semiconductor integrated circuit including a microelectromechanical system (MEMS), a substrate on which the MEMS is formed, and one or more measurement circuits, the MEMS including an array of micro-mirror assemblies, each micro-mirror assembly including: a micro-mirror comprising a first connection structure and a second connection structure, the first connection structure being connected to the substrate at a first pivot point, the second connection structure being connected to the substrate at a second pivot point; and an actuator configured to rotate the micro-mirror to reflect light emitted by a light source out of the LiDAR module or to reflect light received by the LiDAR module to a receiver. One or more micro-mirror assemblies of the array of micro-mirror assemblies further includes a measurement structure connected to the micro-mirror, an electrical resistance of the measurement structure being variable based on a rotation angle of the micro-mirror. The one or more measurement circuits are configured to: determine the electrical resistance of the measurement structure of the one or more micro-mirror assemblies; and provide the determined electrical resistance to enable measurement of a rotation angle of the micro-mirror of the one or more micro-mirror assemblies.

In some aspects, the measurement structure comprises an axial portion and a link portion. The axial portion is connected to the substrate. The link portion is connected between the axial portion and the micro-mirror.

In some aspects, a first end of the axial portion is connected to a first electrical contact on the substrate. A second end of the axial portion is connected to a second electrical contact on the substrate. A measurement circuit of the one or more measurement circuit is electrically connected to the first electrical contact and the second electrical contact to measure an electrical resistance of the measurement structure of one of the one or more micro-mirror assemblies.

In some aspects, the axial portion is parallel with a rotation axis of the micro-mirror. The link portion is perpendicular to the rotation axis of the micro-mirror.

In some aspects, the measurement structure is configured to provide a current conduction path that traverses directly across the axial portion between the first electrical contact and the second electrical contact.

In some aspects, the axial portion has a higher resistivity than the link portion.

In some aspects, the axial portion is doped with a dopant that increases the resistivity of the axial portion relative to the link portion.

In some aspects, the measurement structure is configured to provide a current conduction path that traverses across the axial portion and at least a part of the link portion between the first electrical contact and the second electrical contact.

In some aspects, the measurement structure comprises an opening between a first part of the axial portion and a second part of the axial portion. The first part of the axial portion and the second part of the axial portion are connected to at least a part of the link portion.

In some aspects, the first part of the axial portion and the second part of the axial portion are coated with a metal layer. The at least a part of the link portion is doped with a dopant to increase a resistivity of the at least at part of the link portion.

In some aspects, the link portion comprises a fork structure including a plurality of tine structures. The link portion is connected to the micro-mirror at one of the plurality of tine structures.

In some aspects, the link portion is coated with an anti-reflection layer.

In some aspects, the apparatus further comprises a controller. The controller is configured to: determine, for each micro-mirror assembly, a first signal based on a target rotation angle of the micro-mirror; transmit the first signal to the actuator of each micro-mirror assembly; obtain, from the one or more measurement circuits, measurements of the electrical resistance of the measurement structure of the one or more micro-mirror assemblies; determine, for each micro-mirror assembly, a second signal based on the measurements; and transmit the second signal to the actuator of the respective micro-mirror assembly.

In some aspects, the controller is configured to: determine, based on the measurements of the electrical resistance of the measurement structure of the one or more micro-mirror assemblies, actual rotation angles of the micro-mirror of the one or more micro-mirror assemblies; determine differences between the actual rotation angles and the target rotation angle; and determine the second signal for the one or more micro-mirror assemblies based on the differences.

In some aspects, a measurement circuit of the one or more measurement circuits is configured to output a third signal representing a difference between the electrical resistances of the measurement structures of a first micro-mirror assembly and a second micro-mirror assembly of the one or more micro-mirror assemblies. The controller is configured to determine, based on the third signal, the second signal for the first micro-mirror assembly and for the second micro-mirror assembly to reduce the difference.

In some aspects, a measurement circuit of the one or more measurement circuits is configured to output a third signal representing a difference among the electrical resistances of the measurement structures of a first micro-mirror assembly, a second micro-mirror assembly, a third micro-mirror assembly, and a fourth micro-mirror assembly of the one or more micro-mirror assemblies. The controller is configured to determine, based on the third signal, the second signal for the first micro-mirror assembly, the second micro-mirror assembly, the third micro-mirror assembly, and the fourth micro-mirror assembly to reduce the difference.

In some aspects, each of the one or more measurement circuits comprises a bridge circuit.

In some aspects, the actuator comprises one of: an electrostatic actuator, an electromagnetic actuator, or a piezoelectric actuator.

In some examples, a method is provided. The method comprises: determining a first signal based on a target rotation angle of a micro-mirror of one or more micro-mirror assemblies of an array of micro-mirror assemblies, the array of micro-mirror assemblies being part of an MEMS implemented on a substrate, the micro-mirror comprising a first connection structure and a second connection structure, the first connection structure being connected to the substrate at a first pivot point, the second connection structure being connected to the substrate at a second pivot point, the one or more micro-mirror assemblies of the array of micro-mirror assemblies further including a measurement structure connected to the micro-mirror, an electrical resistance of the measurement structure being variable based on a rotation angle of the micro-mirror; transmitting the first signal to an actuator of the micro-mirror assembly to rotate the micro-mirror by the target rotation angle; and obtaining, from one or more measurement circuits, measurements of the electrical resistance of the measurement structure of the one or more micro-mirror assemblies to determine a rotation angle of the micro-mirror of the one or more micro-mirror assemblies in response to the first signal.

In some aspects, the method further comprises: determining, for each micro-mirror assembly, a second signal based on the measurements of the electrical resistance; and transmitting the second signal to the actuator of the respective micro-mirror assembly

BRIEF DESCRIPTION OF THE DRAWINGS

The detailed description is set forth with reference to the accompanying figures.

FIG. 2A, FIG. 2B, FIG. 2C, FIG. 2D, and FIG. 2E illustrate examples of a light steering system, according to examples of the present disclosure.

FIG. 5A, FIG. 5B, FIG. 5C, and FIG. 5D illustrate other examples of internal components of the light steering system of FIG. 3A-FIG. 3C, according to examples of the present disclosure.

FIG. 6 illustrates a flowchart of a method of operating a mirror assembly, according to certain embodiments.

DETAILED DESCRIPTION

Figure 1:
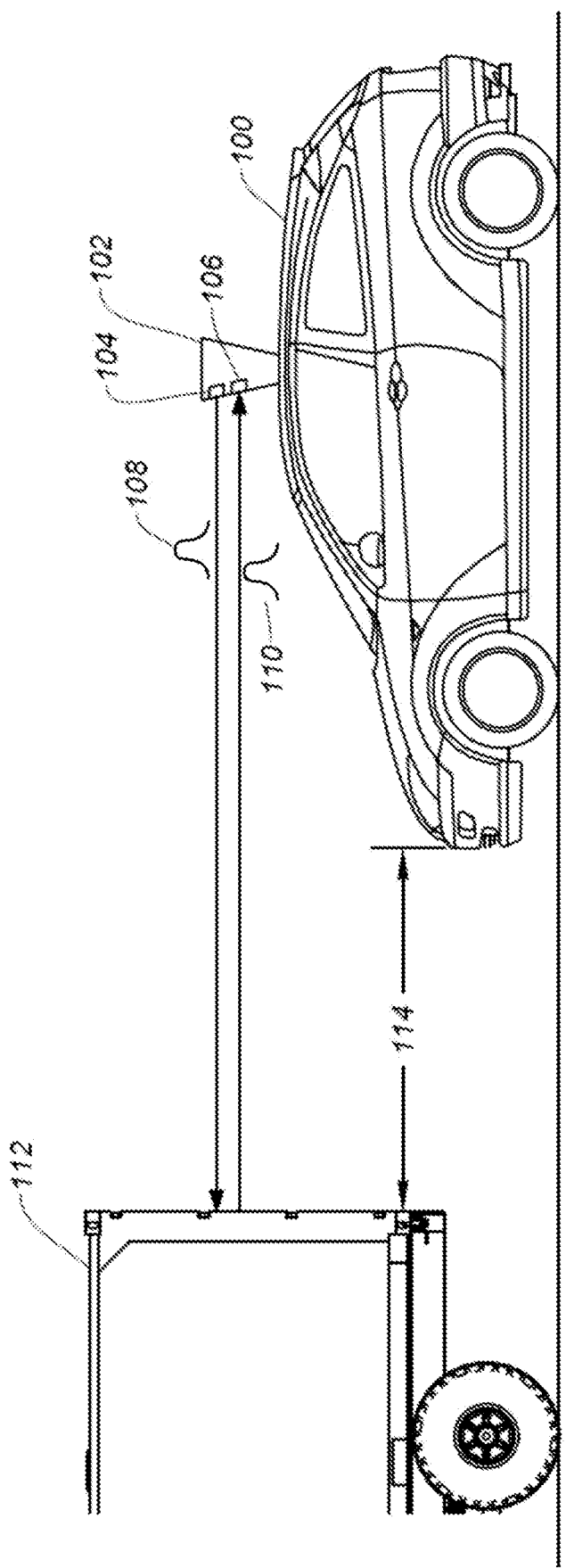
FIG. 1 shows an autonomous driving vehicle utilizing aspects of certain embodiments of the disclosed techniques herein.

In the following description, various examples of an adaptive control system of a micro-mirror array will be described. The adaptive control system can adjust the control signals for each micro-mirror of the array based on a measurement of an instantaneous rotation angle of the micro-mirror, and a difference (if any) between the instantaneous rotation angle and the target rotation angle of the micro-mirror. For purposes of explanation, specific configurations and details are set forth to provide a thorough understanding of the embodiments. However, it will be apparent to one skilled in the art that certain embodiments may be practiced or implemented without every detail disclosed. Furthermore, well-known features may be omitted or simplified to prevent any obfuscation of the novel features described herein.

Light steering can be found in different applications. For example, a light detection and ranging (LiDAR) module of a vehicle may include a light steering system. The light steering system can be part of the transmitter to steer light towards different directions to detect obstacles around the vehicle and to determine the distances between the obstacles and the vehicle, which can be used for autonomous driving. Moreover, a receiver may also include a micro-mirror array to select a direction of incident light to be detected by the receiver to avoid detecting other unwanted signals. Further, the headlight of a manually driven vehicle can include the light steering system, which can be controlled to focus light towards a particular direction to improve visibility for the driver. In another example, optical diagnostic equipment, such as an endoscope, can include a light steering system to steer light in different directions onto an object in a sequential scanning process to obtain an image of the object for diagnosis.

Light steering can be implemented by way of a micro-mirror array. The micro-mirror array can have an array of micro-mirror assemblies, with each micro-mirror assembly having a movable micro-mirror and an actuator (or multiple actuators). The micro-mirrors and actuators can be formed as microelectromechanical systems (MEMS) on a semiconductor substrate, which allows integration of the MEMS with other circuitries (e.g., controller, interface circuits) on the semiconductor substrate. In a micro-mirror assembly, a micro-mirror can be connected to the semiconductor substrate via a pair of connection structures (e.g., a torsion bar, a spring) to form a pair of pivots. The actuator can rotate the micro-mirror around the pair of pivots, with the connection structure deformed to accommodate the rotation. The array of micro-mirrors can receive incident light beam, and each micro-mirror can be rotated at a common rotation angle to project/steer the incident light beam at a target direction. Each micro-mirror can be rotated around two orthogonal axes to provide a first range of angles of projection along a vertical dimension and to provide a second range of angles of projection along a horizontal dimension. The first range and the second range of angles of projection can define a two-dimensional field of view (FOV) in which light is to be projected to detect/scan an object. The FOV can also define the direction of incident lights, reflected by the object, that are to be detected by the receiver.

Compared with using a single mirror to steer the incident light, a micro-mirror array can provide a comparable, or even larger, aggregate reflective surface area. With a larger reflective surface area, incident light with a larger beam width can be projected onto the micro-mirror array for the light steering operation, which can mitigate the effect of dispersion and can improve the imaging/ranging resolution. Moreover, each individual micro-mirror has a smaller size and mass, which can lessen the burdens on the actuators that control those micro-mirrors and can improve reliability. Further, the actuators can rotate the micro-mirrors by a larger rotation angle for a given torque, which can improve the FOV of the micro-mirror array.

For both single-mirror and micro-mirror array, the control precision can substantially affect their performances. Specifically, an actuator may receive a control signal designed to rotate a mirror (or a micro-mirror) by a target rotation angle, but due to limited control precision, the actuator may be unable to rotate the mirror exactly by that target rotation angle. As a result, the mirror may be unable to rotate over a desired range of angle, which can reduce the achievable FOV. Moreover, due to the limited control precision, the rotation angles of each micro-mirror in the array also vary. The non-uniformity in the rotation angles of the micro-mirrors can increase the dispersion of the reflected light and reduce the imaging/ranging resolution.

The control precision limitation can come from various sources, such as, for example, variations in the fabrication process and non-idealities in the actuator and/or in the transmission of the control signal. Specifically, the control signal can be determined based on a required torque for a target rotation angle, and the required torque may be determined based on a predetermined spring stiffness of the connection structures. The actual spring stiffness may depend on the dimension of the connection structures, which may vary due to variations in the fabrication process. As a result, the predetermined spring stiffness may not match the actual spring stiffness. As another example, the actuator may not create the target torque in response to the control signal due to various non-idealities. For example, due to electrical resistance of the transmission paths of the control signal, the amplitude of the control signal can be reduced when it arrives at the actuator. In all these cases, the actual rotation angle of the micro-mirror may not match the target rotation angle, which leads to degradation in the control precision of the micro-mirror.

Conceptual Overview of Certain Embodiments

Figure 2A:
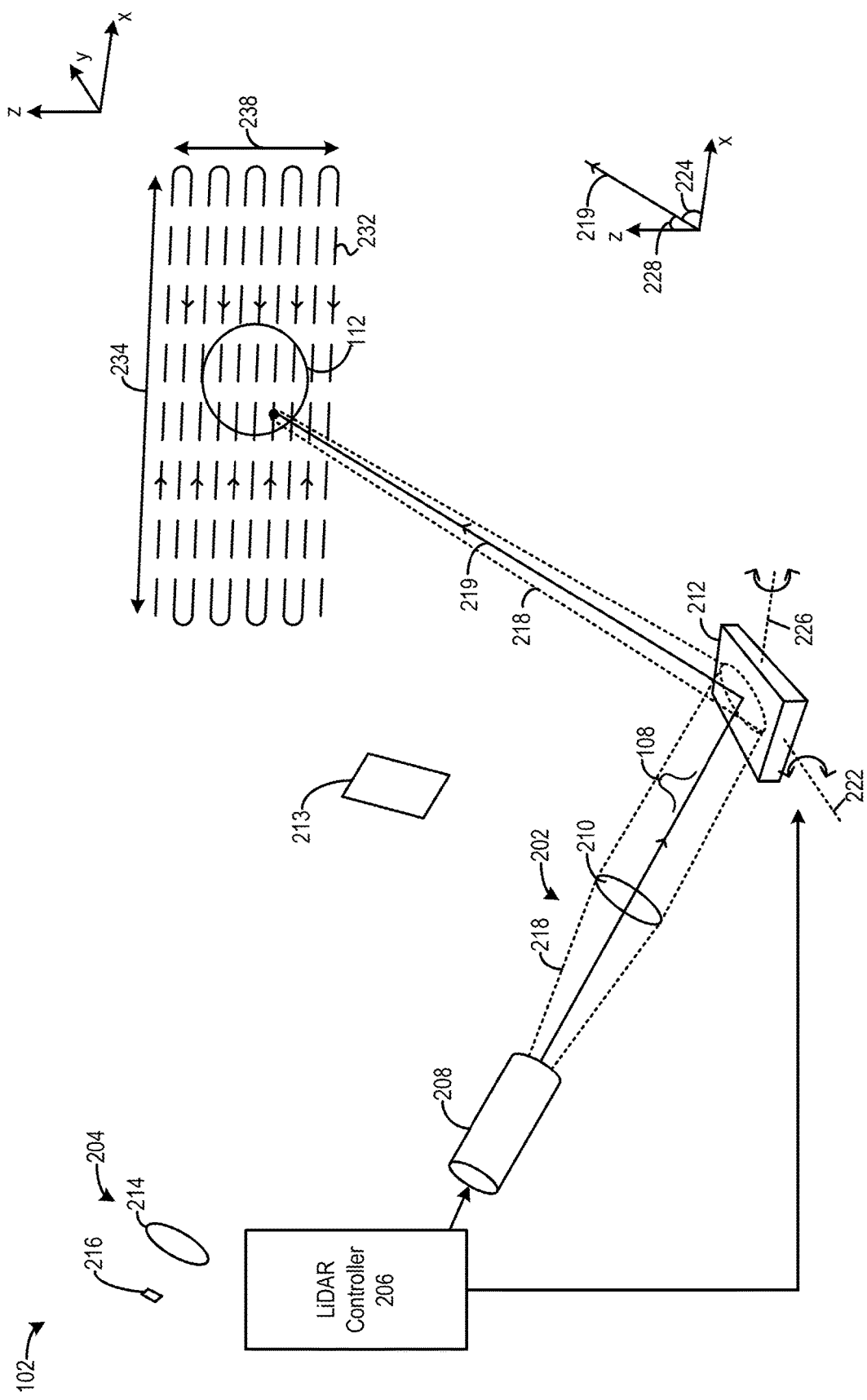
Figure 2B:
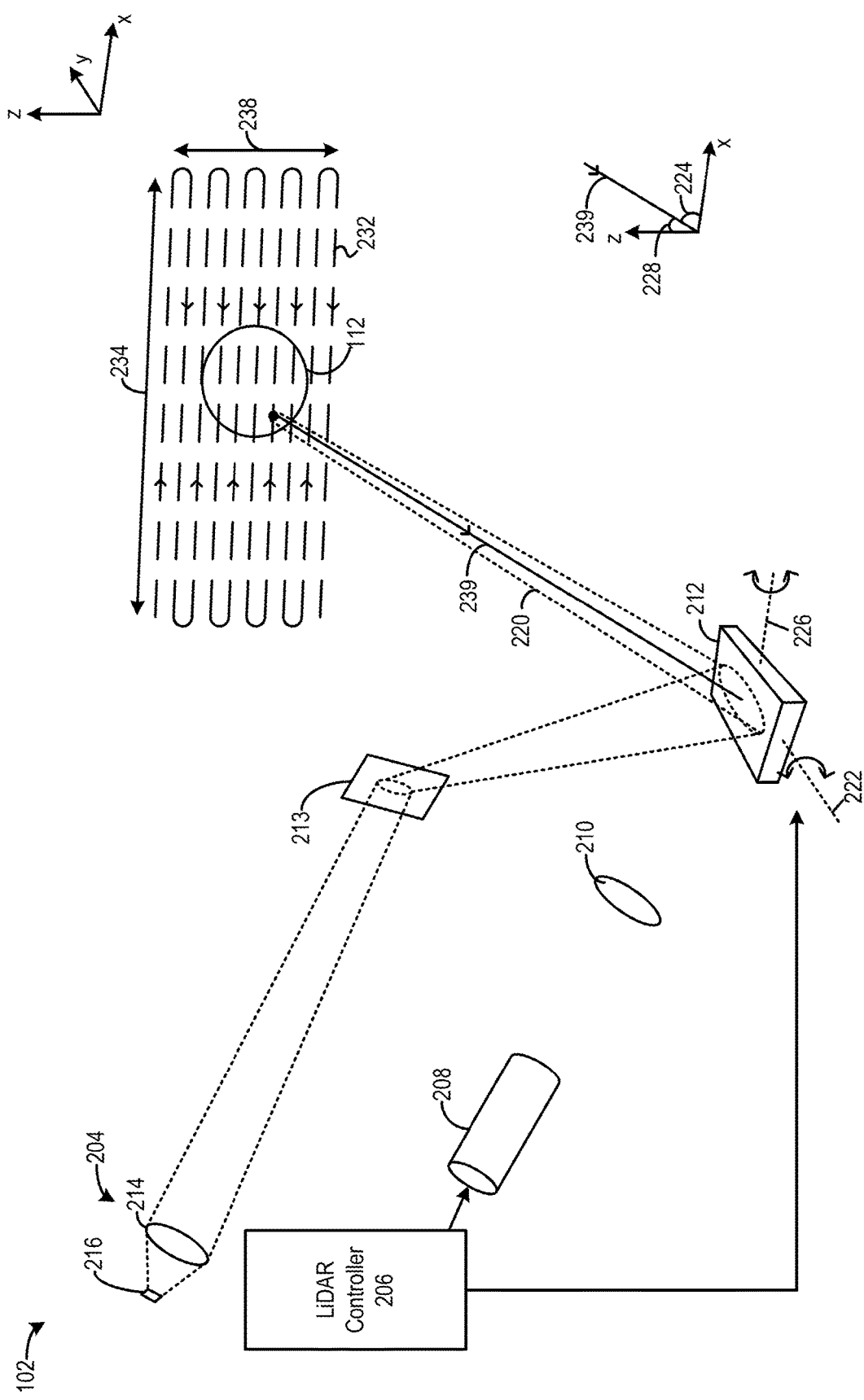

Examples of the present disclosure relate to a light steering system that can address the problems described above. As shown in FIG. 2A and FIG. 2B, the light steering system can be used as part of a transmitter to control a direction of projection of output light. The light steering system can also be used as part of a receiver to select a direction of input light to be detected by the receiver. The light steering system can also be used in a coaxial configuration such that the light steering system can project output light to a location and detects light reflected from that location. Various embodiments of the light steering can include a plurality of mirrors to perform light steering, such as those shown and described below with respect to FIG. 2C.

Figure 3A:
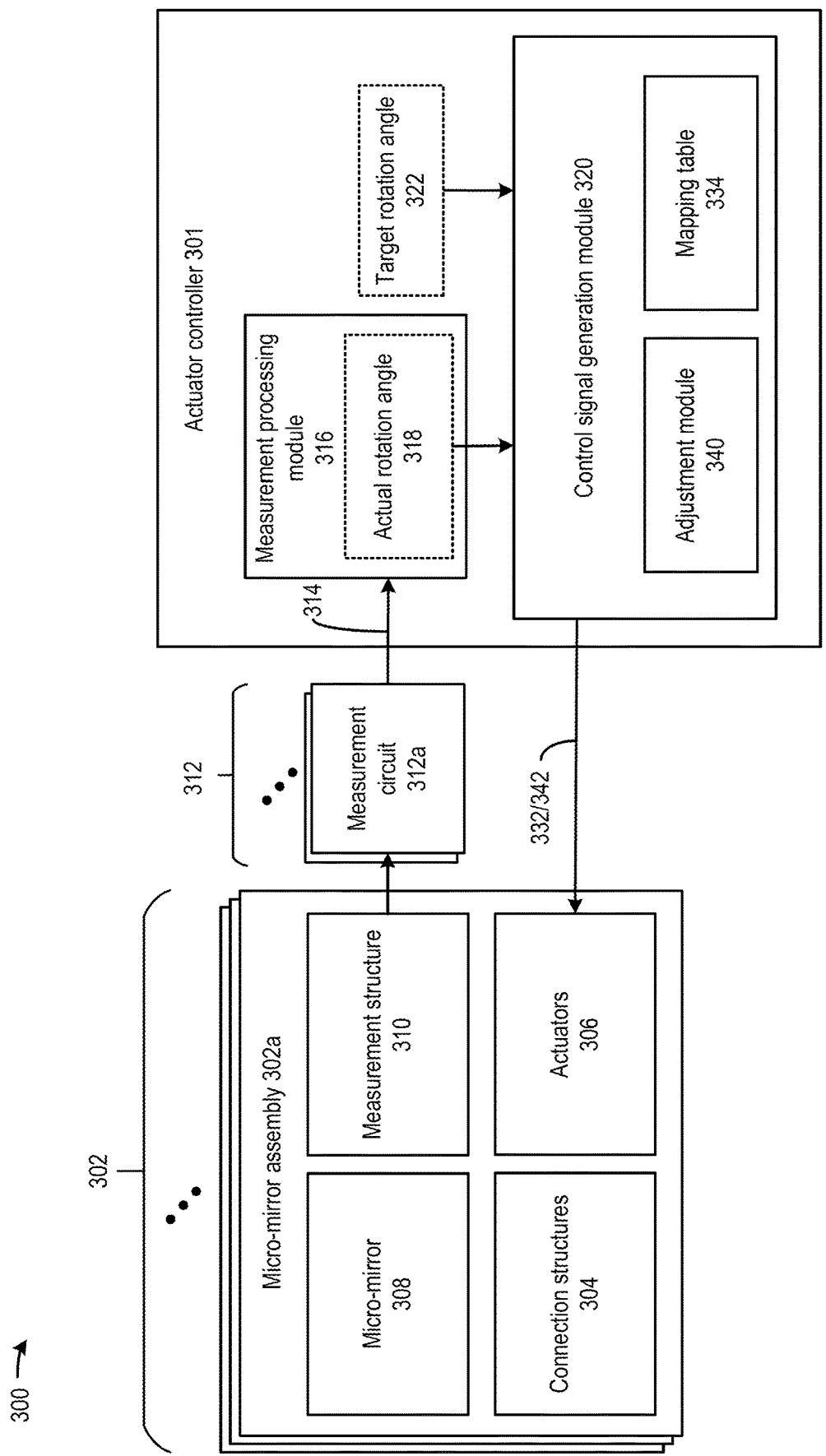
FIG. 3A, FIG. 3B, FIG. 3C, and FIG. 3D illustrate other examples of a light steering system and its operation, according to examples of the present disclosure.

In some examples, a light steering system includes a semiconductor integrated circuit. The semiconductor integrated circuit includes an MEMS and substrate on which the MEMS is formed. An example of the semiconductor integrated circuit is shown in FIG. 3A. The MEMS includes an array of micro-mirror assemblies. Each micro-mirror assembly includes a micro-mirror and an actuator. The micro-mirror includes a first connection structure and a second connection structure, the first connection structure being connected to the substrate at a first pivot point and the second connection structure being connected to the substrate at a second pivot point. The actuator is configured to rotate the micro-mirror around the first pivot point and the second pivot point. The actuator rotates the micro-mirror via, for example, an electrostatic force (e.g., a comb drive) or a mechanical push/pull force (e.g., a piezoelectric device). In some examples, referring to FIG. 2D, the micro-mirror includes a gimbal/frame that surrounds a light-reflecting surface, and first and second connection structures connect between the gimbal and the substrate.

The semiconductor integrated circuit further includes a controller. The controller is configured to, for each micro-mirror assembly, determine a first signal based on a target rotation angle of the micro-mirror and transmit the first signal to the actuator of the micro-mirror assembly. Upon transmission of the first signal, the controller can obtain, from the measurement circuit, a measurement of the electrical resistance of at least one of the first connection structure or the second connection structure. The controller can determine, based on the measurement of the electrical resistance, an actual rotation angle of the micro-mirror in response to the first signal. The controller can then determine a second signal based on the first signal and based on a relationship between the target rotation angle and the actual rotation angle, and transmit the second signal to the actuator of the micro-mirror assembly to cause the micro-mirror to rotate by the target rotation angle.

Figure 3B:
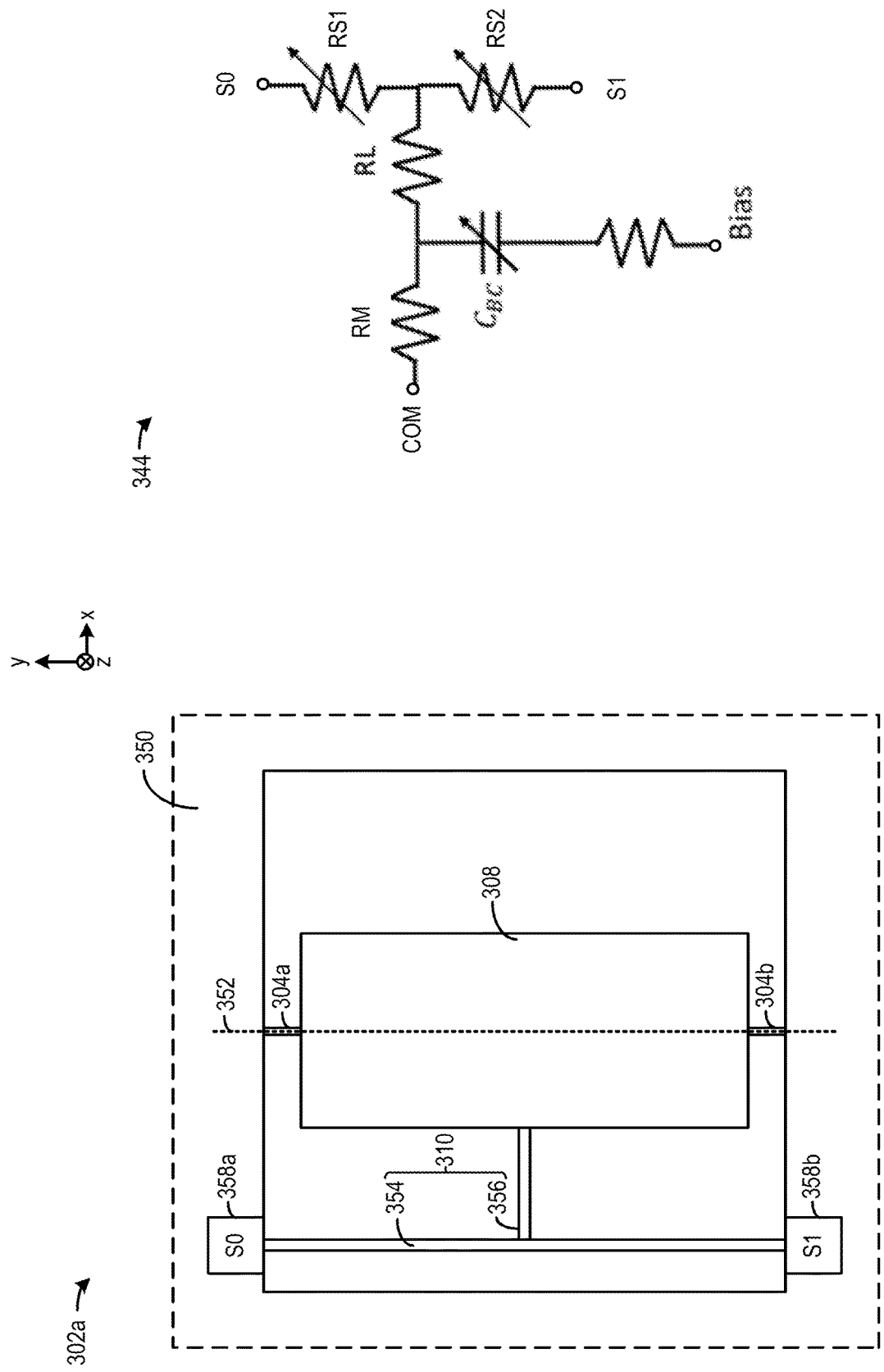

In some examples, one or more micro-mirror assemblies of the array of micro-mirror assemblies can include a measurement structure of which a resistance varies with a rotation angle of the micro-mirror. The semiconductor integrated circuit further includes one or more measurement circuits that can be external or internal to the one or more micro-mirror assemblies to measure the resistance of the measurement structures of the one or more micro-mirror assemblies. FIG. 3B illustrates an example of the measurement structure. The measurement structure and the micro-mirror can be formed in a single silicon structure. The measurement structure can include an axial portion and a link portion. The axial portion can be connected to the substrate. A first end of the link portion can be connected to the axial portion, whereas a second end of the link portion can be connected to the micro-mirror (the gimbal or the light reflecting surface). In some examples, the axial portion of the measurement structure can provide an electrical conduction path (herein after, "conduction path") parallel with a rotation axis of the micro-mirror around which a rotation angle is to be measured. Moreover, the link portion of the measurement structure can provide another conduction path along a direction perpendicular to the rotation axis. The axial portion can be connected to a pair of electrical contacts on the substrate via which the measurement circuit can access the conduction paths of the axial portion and the link portion. FIG. 3D illustrates a top view of array of micro-mirror assemblies including the measurement structures.

Figure 3C:
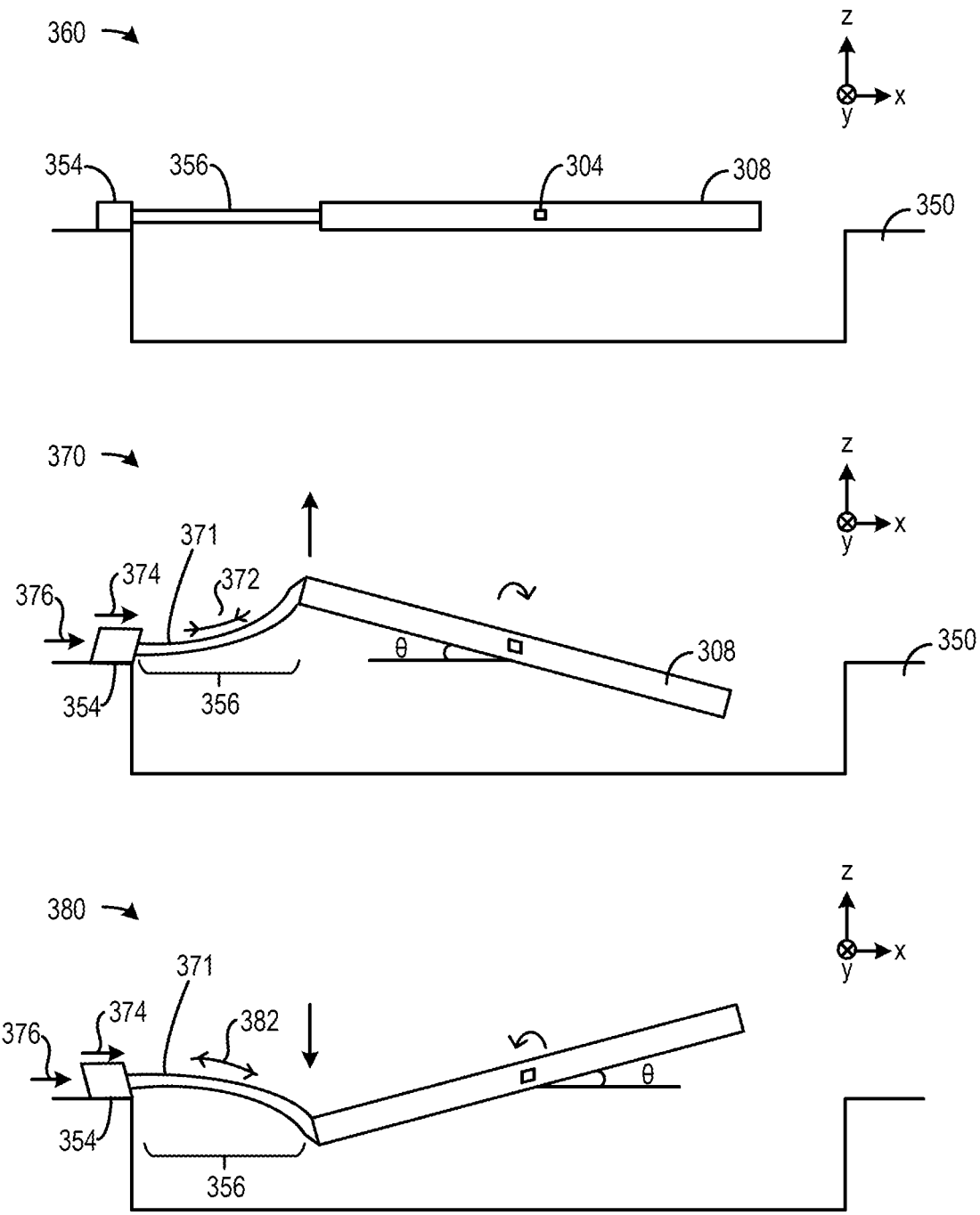
Figure 3D:
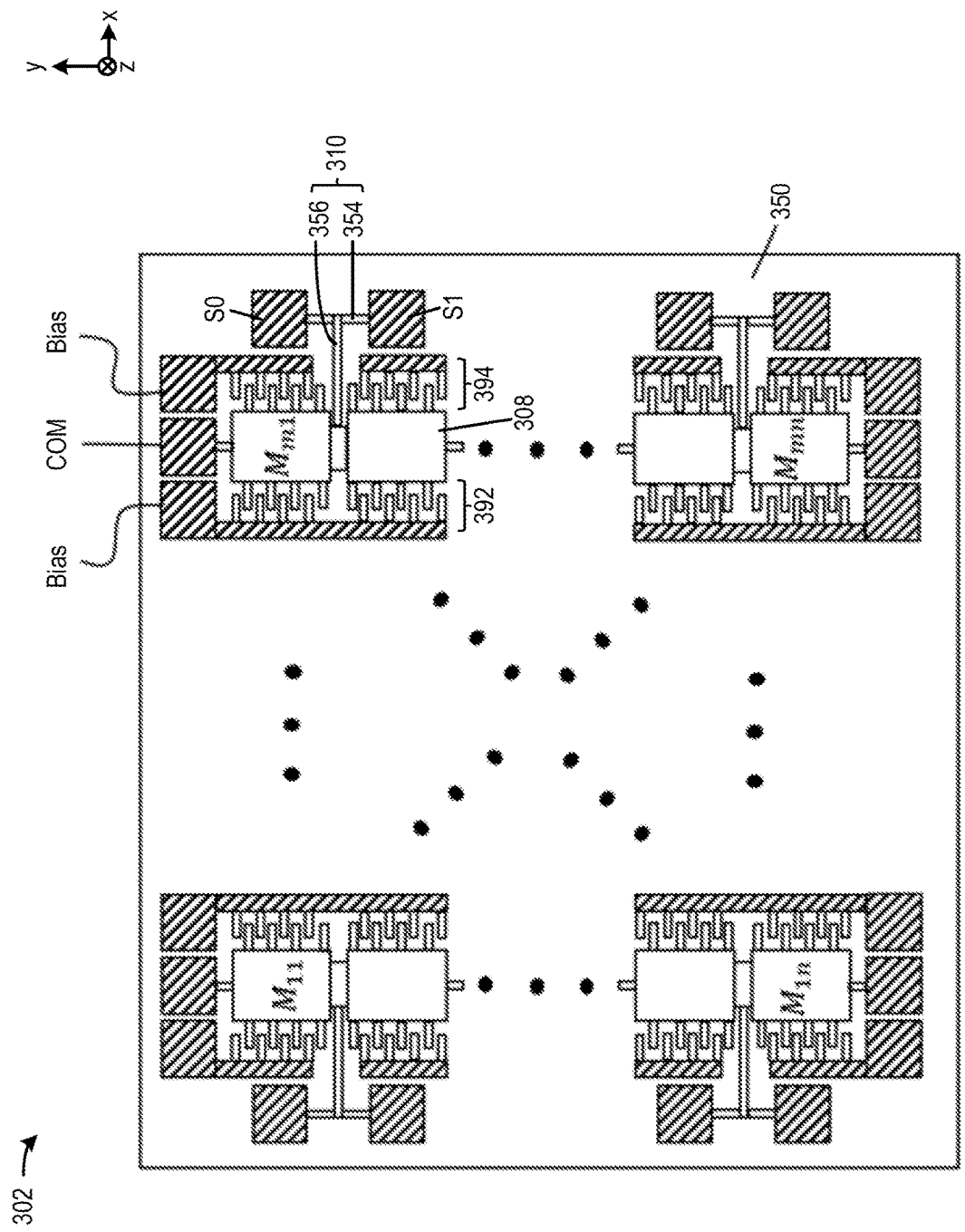

As shown in FIG. 3C, as the micro-mirror rotates, the second end of the link portion of the measurement structure can move up or down in a direction perpendicular to the rotation axis, which can cause the link portion to deform. In some examples, the axial portion can be in the form of a torsion bar, a spring, etc., and can also be deformable to accommodate the movement of the link portion. The deformation can create different stresses (e.g., normal stress, shear stress) in the measurement structure, which can change the electrical resistance of the conduction paths of the axial portion and the link portion of the measurement structure. The degrees of stresses, as well as the resultant changes in the electrical resistance, can reflect the actual rotation angle of the micro-mirror. The measurement circuit can inject a current into the measurement structure, which can flow through the conduction paths provided by the axial structure and/or the link portion of the measurement structure, measure an electrical resistance of the measurement structure based on measuring a voltage generated by the current, and provide the electrical resistance measurement result to the controller.

The controller can implement a feedback loop. In one example, the controller can determine, based on the electrical resistance measurement result provided by the measurement circuit, the actual rotation angle of the micro-mirror. The controller can then generate a second signal by adjusting the first signal to reduce a difference between the actual rotation angle and the target rotation angle, until the difference is below a threshold. In some examples, the adjustment of the first signal can include adjusting an amplitude of the first signal to adjust the torque provided by the actuator. In some examples, the micro-mirror may be rotated according to a periodic pattern. For example, the micro-mirror can be rotated at a frequency close to a natural frequency between a range of angles to induce harmonic resonance, which allows substantial reduction in the required torque to achieve a target FOV. In such a case, the adjustment of the first signal can include adjusting the frequency of the first signal.

Figure 4A:
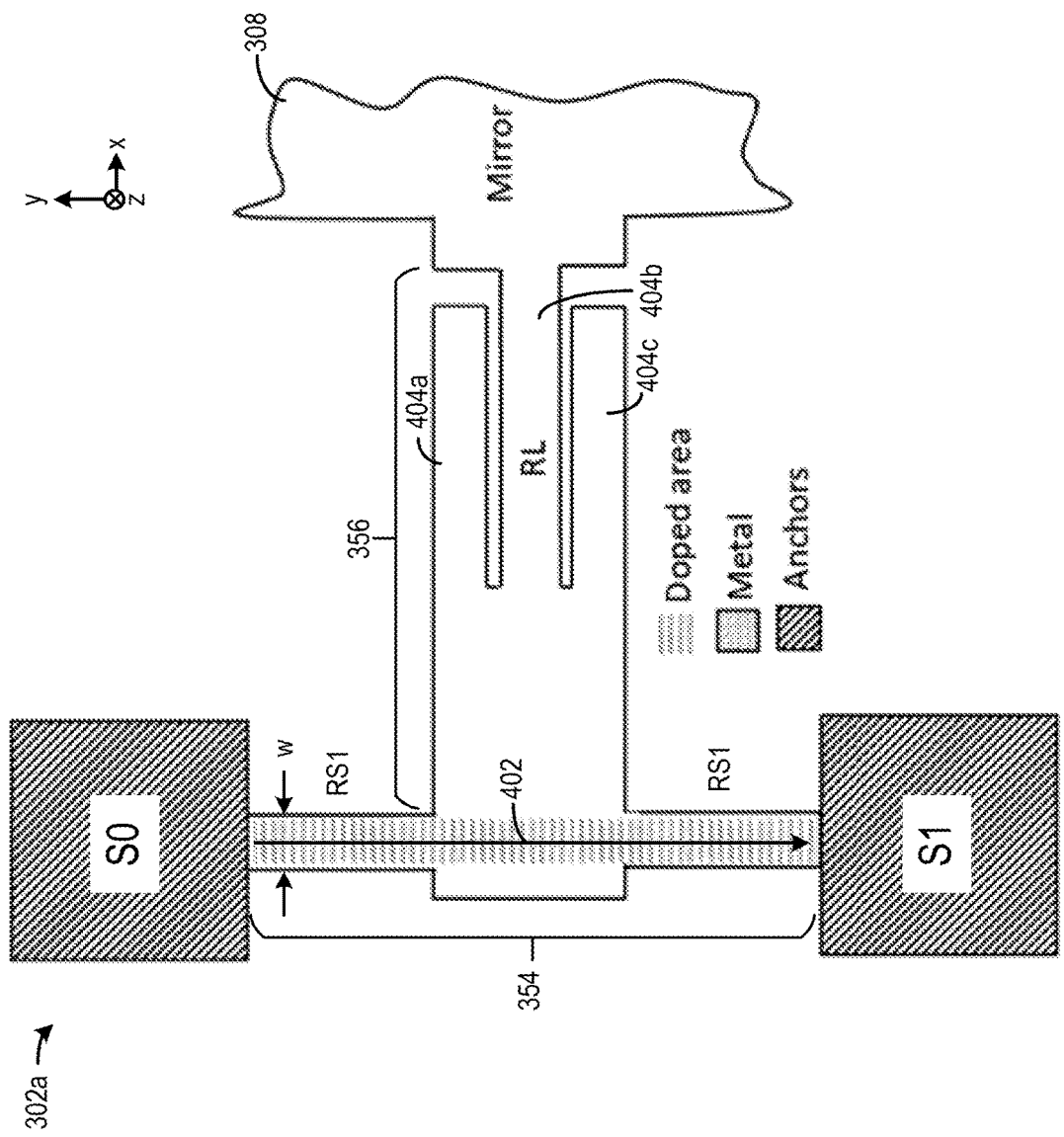
FIG. 4A, FIG. 4B, FIG. 4C, and FIG. 4D illustrate examples of internal components of the light steering system of FIG. 3A-FIG. 3C and their properties, according to examples of the present disclosure.
Figure 4B:
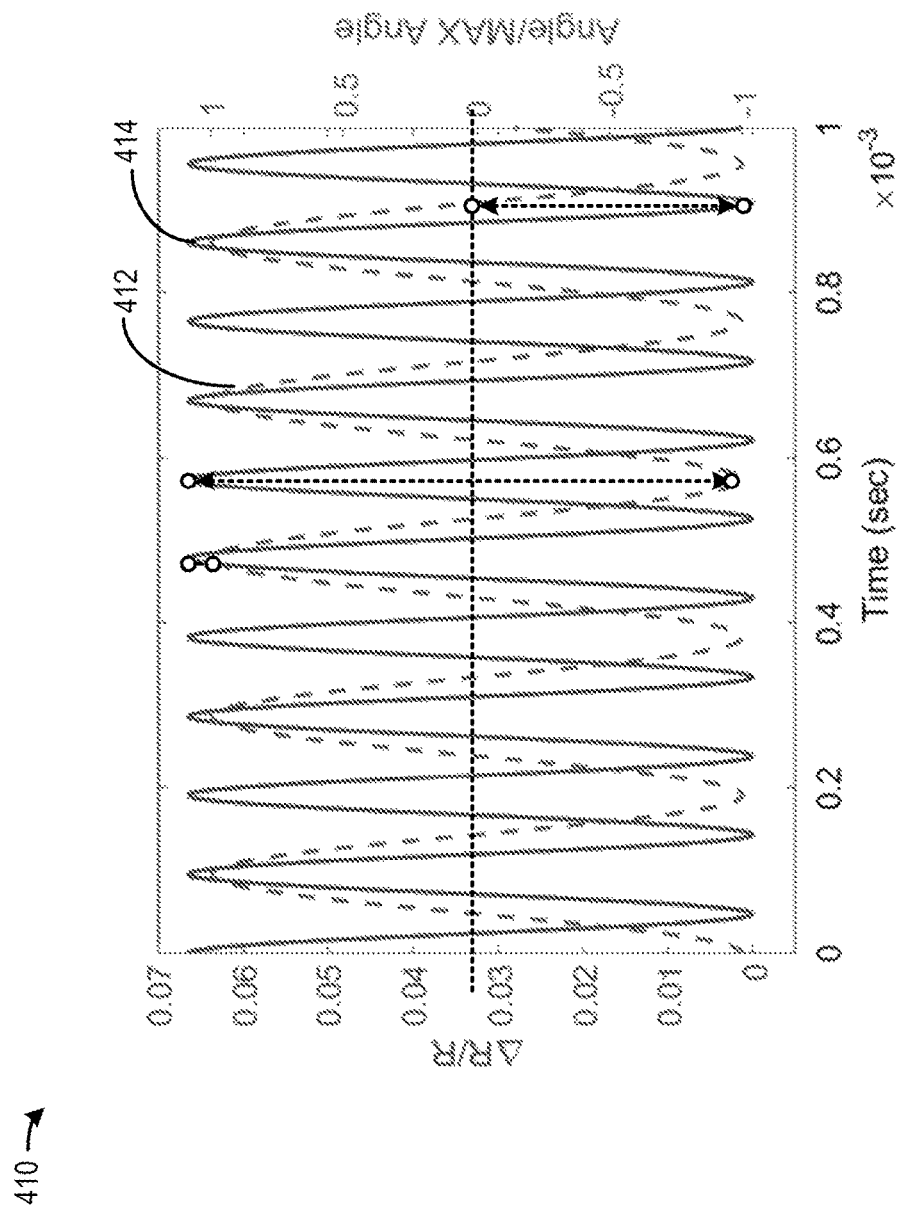

Various examples of the measurement structure are proposed. In some examples, as shown in FIG. 3C, the axial portion can be deformable to accommodate the movement of the link portion as the micro-mirror rotates. The degree of change in the resistivity of the axial portion, caused by the sheer stress and the normal stress as the axial portion deforms, can correspond to the actual rotation angle of the micro-mirror. Referring to FIG. 4A, the measurement structure can be configured such that most (if not all) of the current injected by the measurement circuit flows through the conduction path that is parallel with the rotation axis and that also experiences the sheer stress and the normal stress as the micro-mirror rotates, such that the resistance change of the conduction path reflects the actual rotation angle of the micro-mirror. The measurement circuit can then measure a resistance of conduction path based on measuring the voltage generated by the current, and the controller can determine the actual rotation angle of the micro-mirror based on the voltage. Referring to FIG. 4B, in a case where the micro-mirror rotates at a frequency following an oscillatory pattern, as the degree of deformation and the resulting resistance change is the same for a particular rotation angle regardless of the rotation direction, the frequency of the voltage output of the measurement circuit can be twice of the frequency of rotation of the micro-mirror.

Figure 4C:
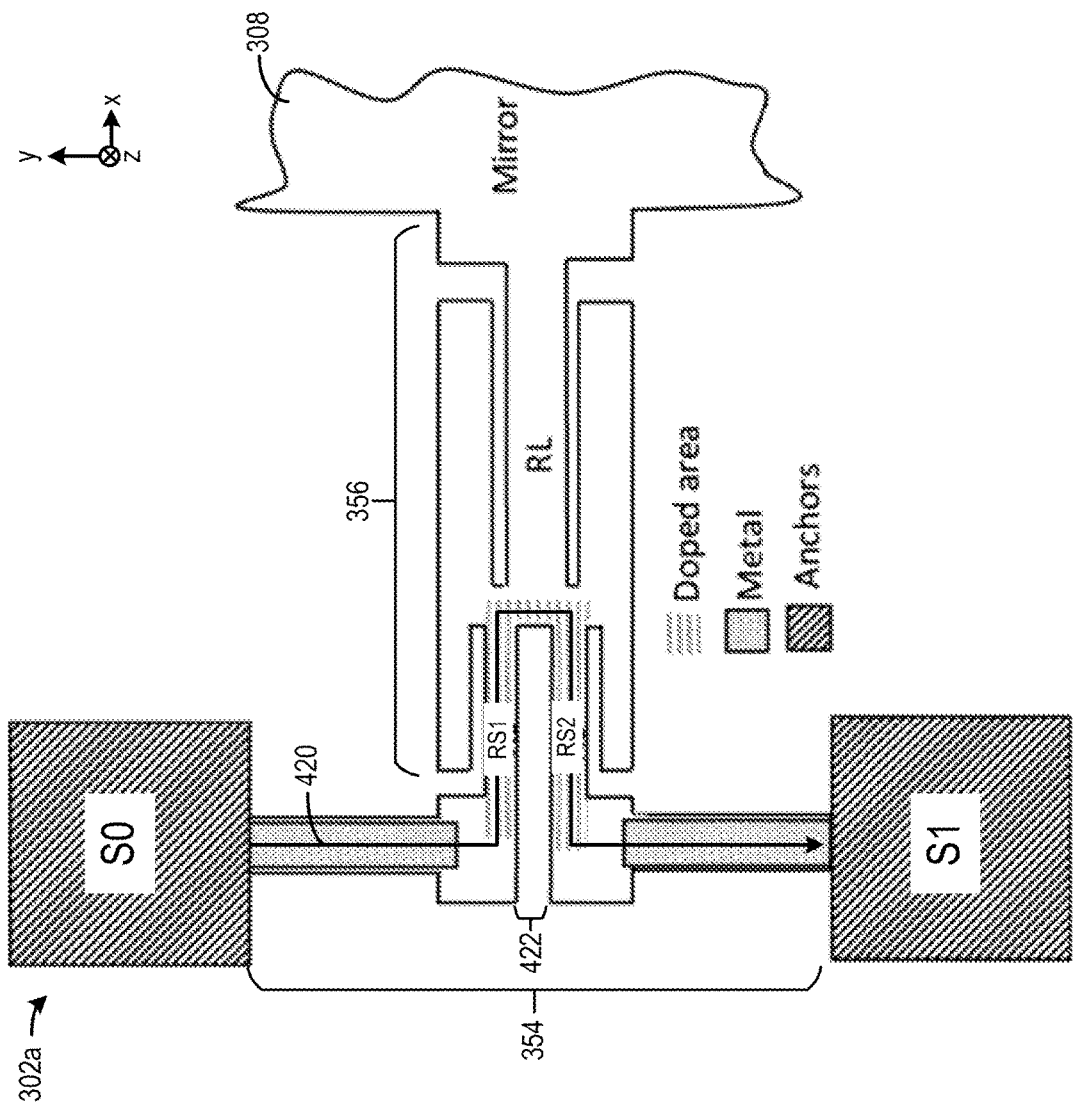

In some examples, as shown in FIG. 3C, the link portion can also deform as the micro-mirror rotates. Depending the direction of rotation of the micro-mirror, a surface of the link portion can receive a tensile stress or a compression stress. The degree of change in the resistivity of the link portion, caused by the stresses, can also correspond to the actual rotation angle of the micro-mirror. Referring to FIG. 4C, the measurement structure can be configured such that the current injected by the measurement circuit flows through the conduction path provided by the link portion that experiences the tensile stress or compression stress as the micro-mirror rotates, such that the resistance change of the conduction path reflects the actual rotation angle of the micro-mirror. The measurement circuit can then measure a resistance of the conduction path based on measuring the voltage generated by the current, and the controller can determine the actual rotation angle of the micro-mirror based on the voltage.

The arrangements of FIG. 4C can further improve the rotation angle measurement operations. Specifically, referring to FIG. 4D, as the rotation direction determines whether the link portion receives a tensile stress or a compression stress, which can provide different degrees of changes in the resistivity, the frequency of the voltage output of the measurement circuit can be the same as the frequency of rotation of the micro-mirror, and the resistance measurement results can be proportional (e.g., a one-to-one correspondence, based on a polynomial, etc.) to the actual rotation angle of the micro-mirror. The proportional relationship allows both the magnitude and the direction of a rotation angle of the micro-mirror to be determined directly from a particular resistance measurement result, without the need to separately track the direction of rotation of the micro-mirror. In addition, as the resistance measurement results and the rotation of the micro-mirror have the same frequency, the resistance measurement results can track the rotation angles more closely, such that the resistance measurements results are linearly related to the actual rotation angles. Accordingly, the actual rotation angles can be determined based on applying a simple linear function, rather than complex non-linear function (e.g., a polynomial function), on the resistance measurements. All these can reduce the complexity and improve the performance of the rotation angle measurement operations.

In addition, as described above, different portions of the measurement structures may provide different relationships between rotation angle and resistance. Referring to FIG. 4A and FIG. 4C, to simplify the determination of rotation angle, a specific portion of the measurement structure of which the resistance is to be measured can be configured to increase the portion's resistivity relative to the rest of the micro-mirror assembly. Such arrangements can ensure that the change in the measured resistance is contributed mostly by the specific portion of the measurement structure. Moreover, the configuration can also amplify a rate of change in the resistance with respect to a change in the rotation angle, which can increase the signal-to-noise ratio and improve the accuracy of actual rotation angle determination. On the other hand, given that the measurement structures typically do not provide physical support to the micro-mirror and also do not affect the rotation of the micro-mirror, the configuration of the measurement structure typically do not affect the rotation properties (e.g., rotation frequency, range) of the micro-mirror.

Specifically, referring to FIG. 4A where the resistance of the conduction path provided by the axial portion under the normal stress and the shear stress is to be measured, the width of the axial portion can be reduced. Moreover, the axial portion can be doped with a dopant. The dopant can introduce asymmetries in the resistance of the axial portion to amplify the resistance change. Examples of the dopants can include Boron, Phosphorus, Arsenic, Gallium, Indium, Antimony, Bismuth and Lithium. All these arrangements can increase the resistance change of the conduction path with respect to stress. In addition, the link portion can have a fork-like structure which can be coated with an anti-reflection layer. The fork-like structure can reduce reflection of light by the substrate and improve the optical efficiency of the micro-mirror. Moreover, only one of the branches of the fork-like structure of the link portion is connected to the micro-mirror to reduce the link portion's mechanical impedance on the micro-mirror. As another example, referring to FIG. 4C where the resistance of the conduction path provided by the link portion under the tensile/compression stresses is to be measured, the portion of the link portion that provides the conduction path can also be narrowed and/or doped with a dopant to increase the resistivity and to introduce asymmetries in the resistance of the conduction path. In addition, while the current also flow through the axial portion into and out of the link portion in FIG. 4C, the axial portion can be coated with a metal layer to reduce the resistivity of the axial portion. Such arrangements can increase the correlation between the measured resistance and the degree of tensile/compression stresses of the link portion, which can further improve the accuracy of the rotation angle measurement.

Figure 5A:
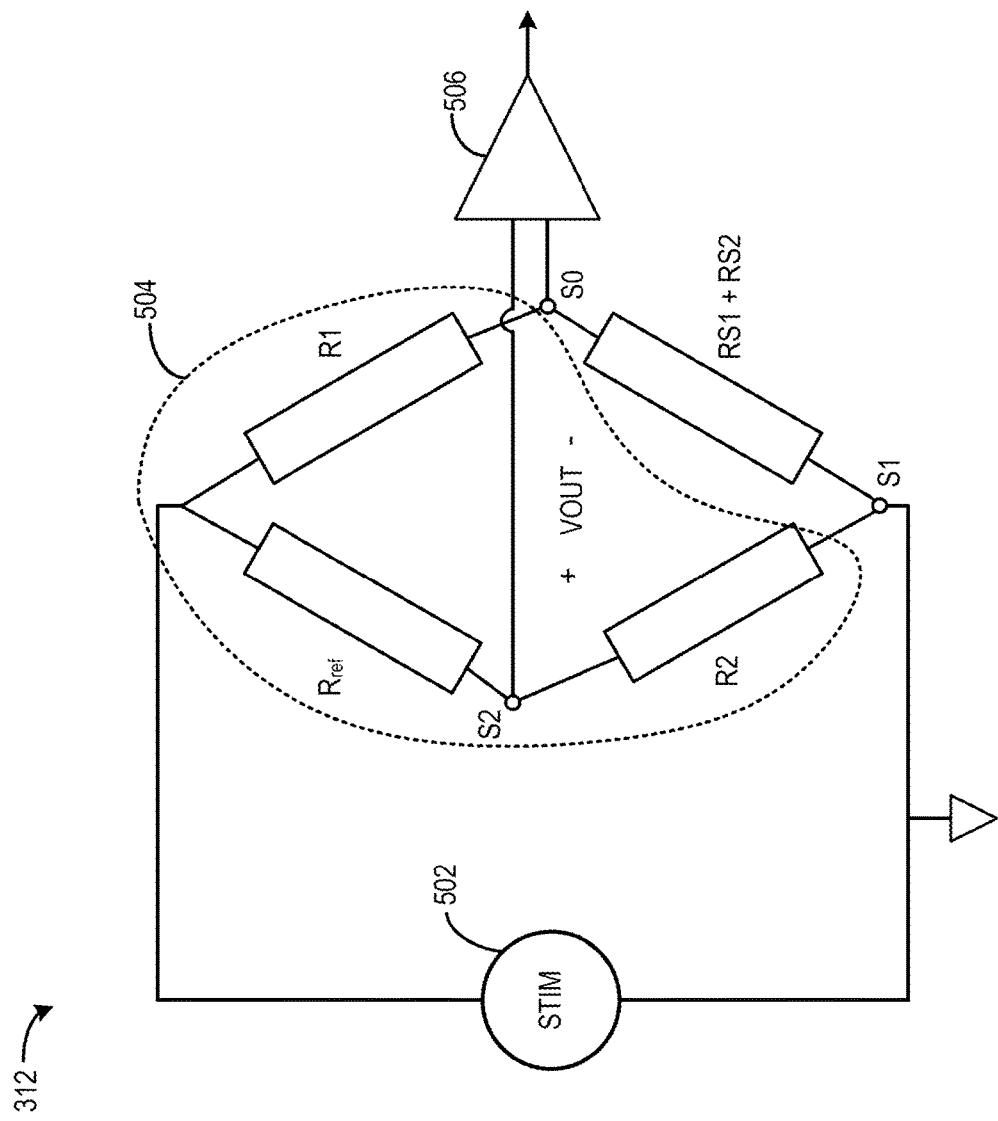

Various examples of measurement circuits are proposed. In some examples, as shown in FIG. 5A, the measurement circuit can include a bridge circuit, a stimulus generator, and an amplifier. The bridge circuit can include a network of resistors that is electrically connected across the two substrate electrical contacts. The network of resistors can include a reference resistor, a first resistor, and a second resistor. The bridge circuit can include two branches, with a first branch including the reference resistor connected in series with a first resistor, and a second branch including the second resistor connected in series with the measurement structure. To measure the electrical resistance of the conductive path in the measurement structure, the stimulus generator can supply an input voltage signal to the bridge circuit, which causes currents to flow through the two branches. An output voltage signal can be generated between the two branches. The output voltage signal can reflect a relationship between the electrical resistance of the reference resistor and the electrical resistance of the conductive path of the measurement structure. The output voltage signal can be amplified by the amplifier. In the example of FIG. 5A, each micro-mirror assembly can include a measurement circuit to measure the resistance of the measurement structure of the micro-mirror assembly.

In some examples, the bridge circuit is configured to generate the output voltage based on comparing the resistances of the measurement structures of multiple micro-mirror assemblies. The output voltage can be used to determine a degree of synchronization of rotation among the multiple micro-mirror assemblies. For example, referring to FIG. 5C, each of the two branches of the bridge circuit can include a measurement structure of a micro-mirror assembly, such that two measurement structures of two different micro-mirror assemblies are included in the bridge circuit. The output voltage generated by the bridge circuit of FIG. 5C can indicate a relationship between the resistances of the two measurement structures, as well as how these resistances compare with a reference resistance. In some examples, each measurement circuit in FIG. 5C can be used to measure the resistances of the measurement structures of two micro-mirror assembles within one row/column of the array of micro-mirror assemblies. The output voltages of the bridge circuits allow the controller to determine a degree of synchronization of rotation among and between each row/column of the array of micro-mirror assemblies.

Figure 5B:
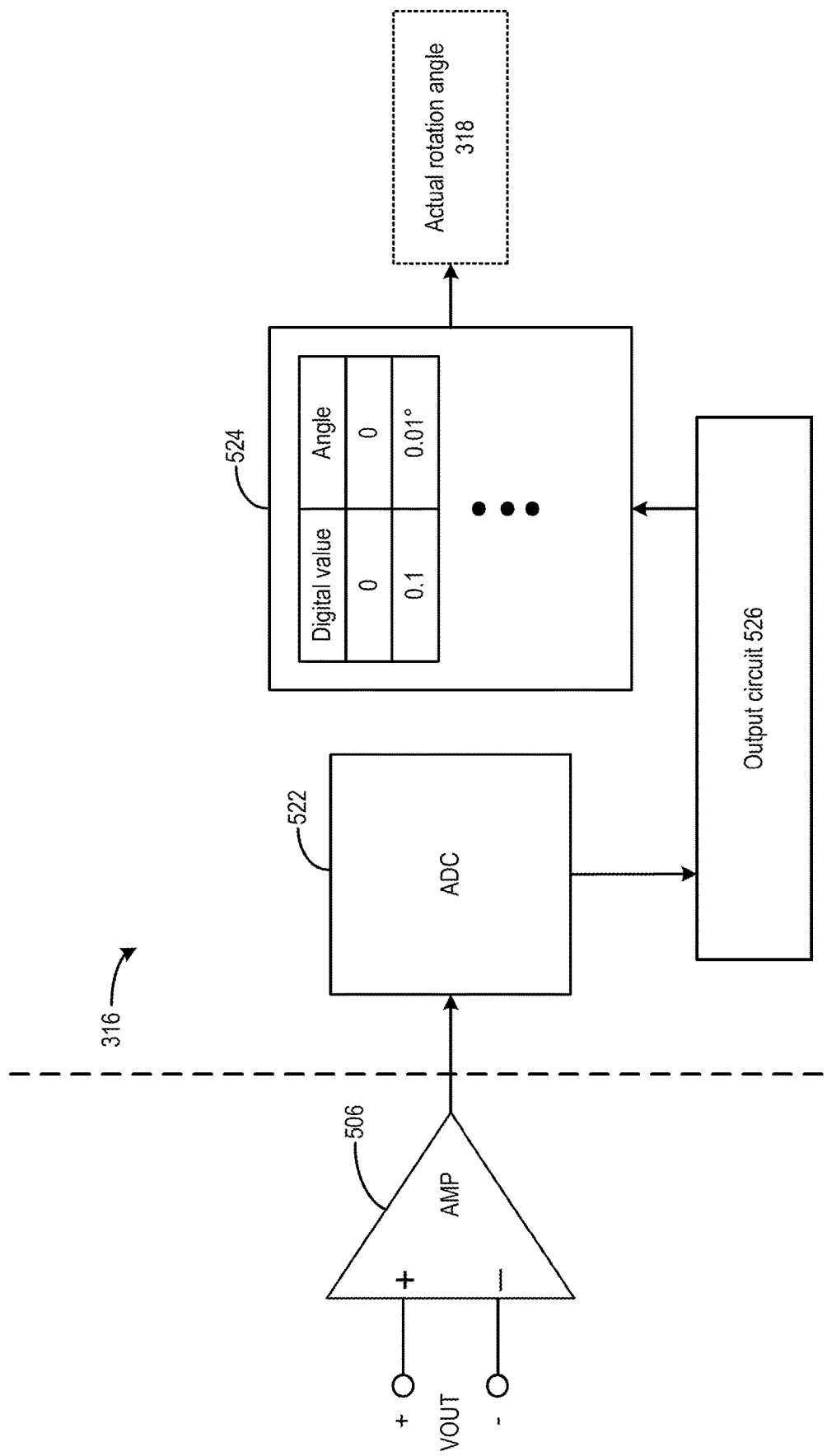
Figure 5D:
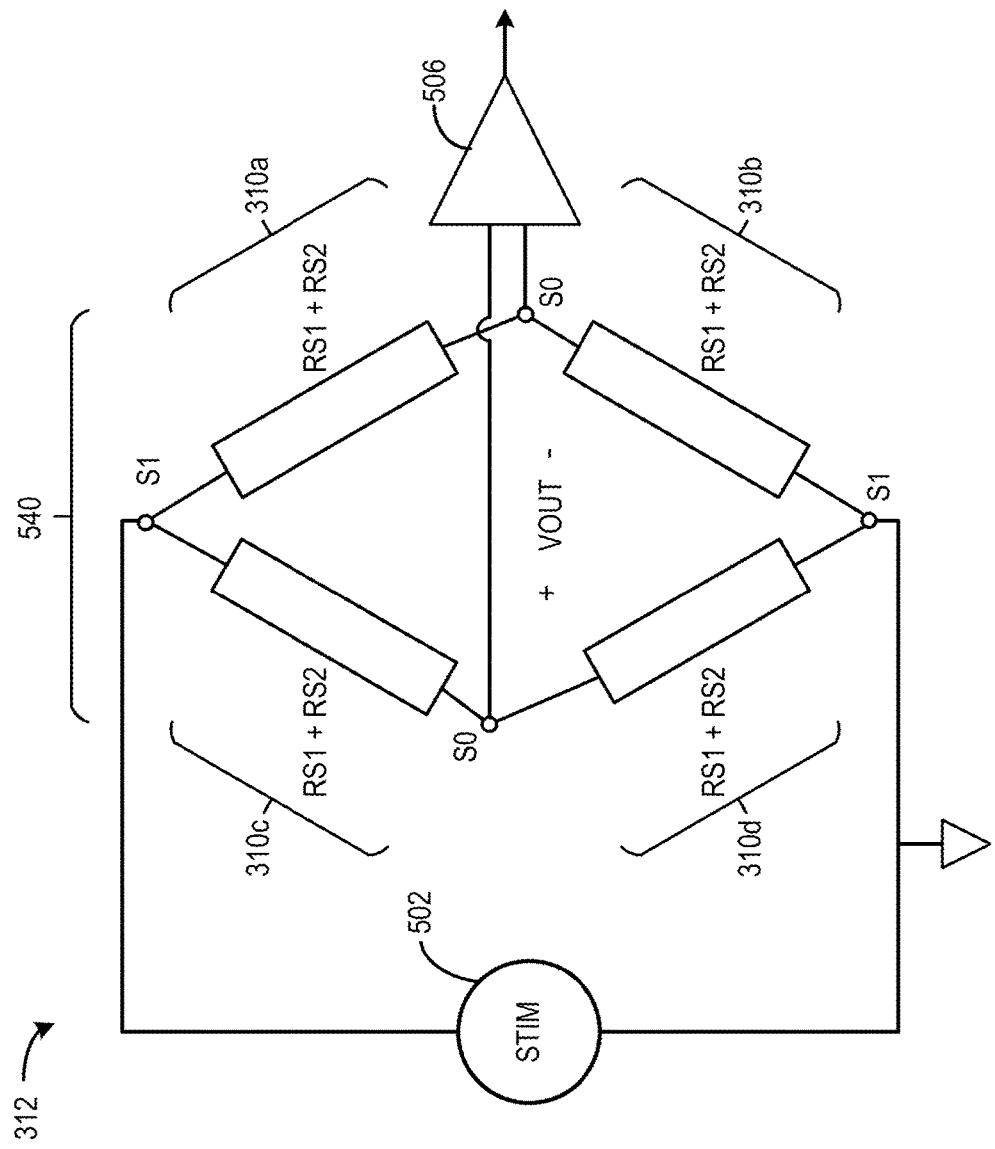

As another example, referring to FIG. 5D, the bridge circuit can include two measurement structures in each of the two branches, so that the output voltage generated by the bridge circuit can indicate a relationship among the resistances of the four measurement structures. The four measurement structures can be in four micro-mirror assemblies on four corners of the array of micro-mirror assemblies. In both examples of FIG. 5C and FIG. 5D, the controller can identify, based on the output voltage from a bridge circuit, which of the micro-mirrors has a different rotation angle from other micro-mirrors, and adjust the amplitude/frequency of the control signal to that micro-mirror to improve the synchronization.

With the disclosed examples, the controller can implement a feedback loop in which the controller can transmit a control signal to an actuator to rotate a micro-mirror by a target rotation angle, obtain a measurement of the actual rotation angle of the micro-mirror in response to the control signal, determine a difference (if any) between the actual rotation angle and the target rotation angle which represents an error angle, and adjust the control signal to reduce the error angle. By adapting the control signal to reduce or even eliminate the error angle, the control precision of the micro-mirror can be improved. The measurement structure can also be configured to increase the resistivity, which can improve the correspondence between the measurement results and the actual rotation angles, while the configuration does not affect the rotation properties of the micro-mirror. In addition, the controller can implement the feedback loop for each micro-mirror (or subsets of the micro-mirrors) of the micro-mirror array to improve the uniformity of rotation among the micro-mirrors, which can reduce the dispersion of the reflected light and improve the imaging/ranging resolution. All of these can improve the robustness and performance of a light steering system.

Typical System Environment for Certain Examples

FIG. 1 illustrates an autonomous vehicle 100 in which the disclosed techniques can be implemented. Autonomous vehicle 100 includes a LiDAR module 102. LiDAR module 102 allows autonomous vehicle 100 to perform object detection and ranging in a surrounding environment. Based on the result of object detection and ranging, autonomous vehicle 100 can maneuver to avoid a collision with the object. LiDAR module 102 can include a light steering transmitter 104 and a receiver 106. Light steering transmitter 104 can project one or more light signals 108 at various directions at different times in any suitable scanning pattern, while receiver 106 can monitor for a light signal 110, which is generated by the reflection of light signal 108 by an object. Light signals 108 and 110 may include, for example, a light pulse, a frequency modulated continuous wave (FMCW) signal, or an amplitude modulated continuous wave (AMCW) signal. LiDAR module 102 can detect the object based on the reception of light pulse 110 and can perform a ranging determination (e.g., a distance of the object) based on a time difference between light signals 108 and 110. For example, as shown in FIG. 1, LiDAR module 102 can transmit light signal 108 at a direction directly in front of autonomous vehicle 100 at time T1 and receive light signal 110 reflected by an object 112 (e.g., another vehicle) at time T2. Based on the reception of light signal 110, LiDAR module 102 can determine that object 112 is directly in front of autonomous vehicle 100. Moreover, based on the time difference between T1 and T2, LiDAR module 102 can also determine a distance 114 between autonomous vehicle 100 and object 112. Autonomous vehicle 100 can adjust its speed (e.g., by slowing or stopping) to avoid collision with object 112 based on the detection and ranging of object 112 by LiDAR module 102.

FIGS. 2A-2E illustrate examples of internal components of a LiDAR module 102. LiDAR module 102 includes a transmitter 202, a receiver 204, and a LiDAR controller 206, which controls the operations of transmitter 202 and receiver 204. Transmitter 202 includes a light source 208 and a collimator lens 210, whereas receiver 204 includes a lens 214 and a photodetector 216. LiDAR module 102 further includes a mirror assembly 212 and a beam splitter 213. In LiDAR module 102, transmitter 202 and receiver 204 can be configured as a coaxial system to share mirror assembly 212 to perform light steering operation, with beam splitter 213 configured to reflect incident light reflected by mirror assembly 212 to receiver 204.

FIG. 2A illustrates a light projection operation. To project light, LiDAR controller 206 can control light source 208 (e.g., a pulsed laser diode, a source of FMCW signal, AMCW signal) to transmit light signal 108 as part of light beam 218. Light beam 218 can disperse upon leaving light source 208 and can be converted into collimated light beam 218 by collimator lens 210. Collimated light beam 218 can be incident upon a mirror assembly 212, which can reflect collimated light beam 218 to steer it along an output projection path 219 towards object 112. Mirror assembly 212 can include one or more rotatable mirrors. FIG. 2A illustrates mirror assembly 212 as having one mirror, but as to be described below, a micro-mirror array comprising multiple micro-mirror assemblies can be used to provide the steering capability of mirror assembly 212. Mirror assembly 212 further includes one or more actuators (not shown in FIG. 2A) to rotate the rotatable mirrors. The actuators can rotate the rotatable mirrors around a first axis 222 and can rotate the rotatable mirrors along a second axis 226. The rotation around first axis 222 can change a first angle 224 of output projection path 219, with respect to a first dimension (e.g., the x-axis), whereas the rotation around second axis 226 can change a second angle 228 of output projection path 219, with respect to a second dimension (e.g., the z-axis). LiDAR controller 206 can control the actuators to produce different combinations of angles of rotation around first axis 222 and second axis 226 such that the movement of output projection path 219 can follow a scanning pattern 232. A range 234 of movement of output projection path 219 along the x-axis, as well as a range 238 of movement of output projection path 219 along the z-axis, can define an FOV. An object within the FOV, such as object 112, can receive and reflect collimated light beam 218 to form reflected light signal, which can be received by receiver 204.

FIG. 2B illustrates a light detection operation. LiDAR controller 206 can select an incident light direction 239 for detection of incident light by receiver 204. The selection can be based on setting the angles of rotation of the rotatable mirrors of mirror assembly 212, such that only light beam 220 propagating along light direction 239 gets reflected to beam splitter 213, which can then divert light beam 220 to photodetector 216 via collimator lens 214. With such arrangements, receiver 204 can selectively receive signals that are relevant for the ranging/imaging of object 112, such as light signal 110 generated by the reflection of collimated light beam 218 by object 112, and not to receive other signals. As a result, the effect of environment disturbance on the ranging/imaging of the object can be reduced and the system performance can be improved.

Figure 2C:
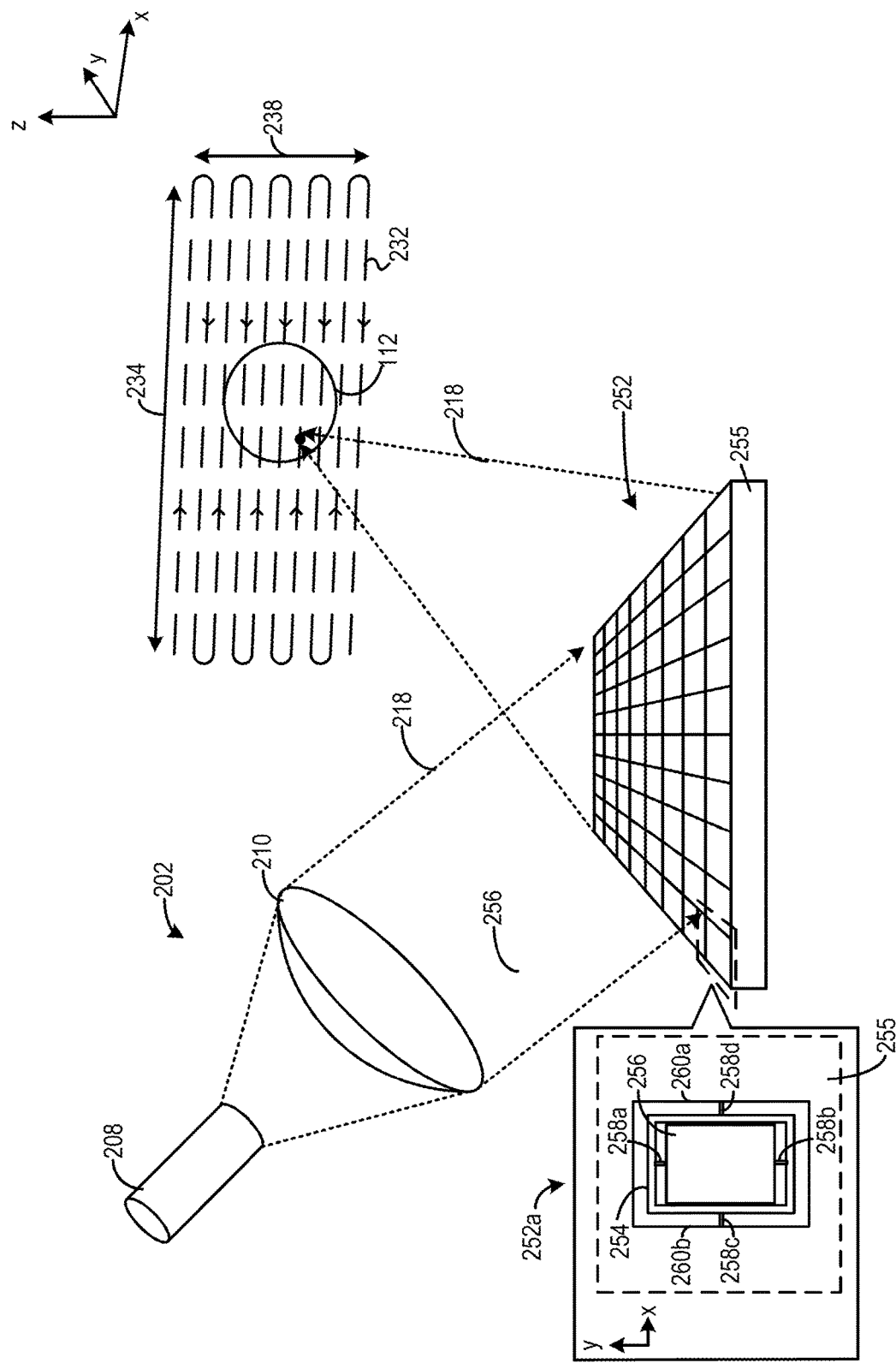

FIG. 2C illustrates an example of a micro-mirror array 250 that can be part of light steering transmitter 202 and can provide the steering capability of mirror assembly 212. Micro-mirror array 250 can include an array of micro-mirror assemblies 252, including micro-mirror assembly 252a. FIG. 2D illustrates an example of micro-mirror assembly 252a. The array of micro-mirror assemblies 252 can include an MEMS implemented on a semiconductor substrate 255. Each of micro-mirror assemblies 252 may include a frame 254 and a micro-mirror 256 forming a gimbal structure. Specifically, connection structures 258a and 258b connect micro-mirror 256 to frame 254, whereas connection structures 258c and 258d connect frame 254 (and micro-mirror 256) to sidewalls 260a and 260b of semiconductor substrate 255. A pair of connection structures can define a pivot/axis of rotation for micro-mirror 256. For example, connection structures 258a and 258b can define a pivot/axis of rotation of micro-mirror 256 about the y-axis within frame 254, whereas connection structures 258c and 258d can define a pivot/axis of rotation of frame 254 and micro-mirror 256 about the x-axis with respect to semiconductor substrate 255.

Each of micro-mirror assemblies 252 can receive and reflect part of light beam 218. The micro-mirror 256 of each of micro-mirror assemblies 252 can be rotated by an actuator of the micro-mirror assembly (not shown in FIG. 2C) at a first angle about the y-axis (around connection structures 258a and 258b) and at a second angle about the x-axis (around connection structures 258c and 258d) to set the direction of output projection path for light beam 218 and to define the FOV, as in FIG. 2A, or to select the direction of input light to be detected by receiver 204, as in FIG. 2B.

To accommodate the rotation motion of mirror 256, connection structures 258a, 258b, 258c, and 258d are configured to be elastic and deformable. The connection structure can be in the form of, for example, a torsion bar or a spring and can have a certain spring stiffness. The spring stiffness of the connection structure can define a torque required to rotate mirror 256 by a certain rotation angle, as follows:

$$\tau = -K\theta. \tag{Equation 1}$$

In Equation 1, τ represents torque and K represents a spring constant that measures the spring stiffness of the connection structure, whereas θ represents a target rotation angle. The spring constant can depend on various factors, such as the material of the connection structure or the cross-sectional area of the connection structure. For example, the spring constant can be defined according to the following equation:

$$K = \frac{k_2 \times G \times w^3 \times t}{L}. \tag{Equation 2}$$

In Equation 2, L is the length of the connection structure, G is the shear modulus of material that forms the connection structure, and $k_2$ is a factor that depends on the ratio between thickness (t) and width (w) given as t/w. The larger the ratio t/w, the more $k_2$ is like a constant. The table below provides illustrative examples of $k_2$ for different ratios of t/w:

| Ratio of t/w | $k_2$ |
|---|---|
| 1 | 0.141 |
| 2 | 0.229 |
| 3 | 0.263 |
| 6 | 0.298 |
| ∞ | 0.333 |

In a case where w is one-third of t or less, $k_2$ becomes almost like a constant, and spring constant K can be directly proportional to thickness.

Figure 2E:
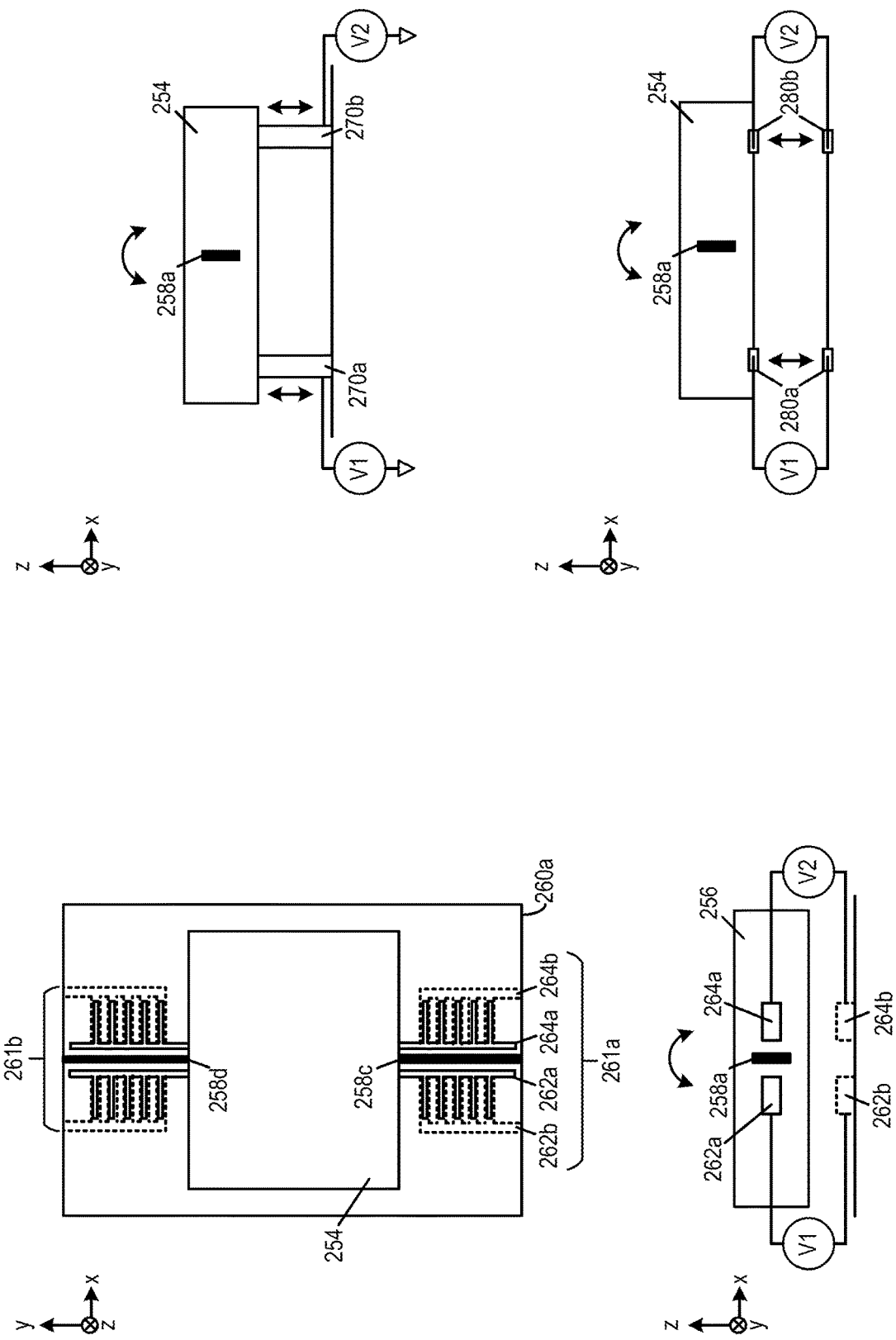

Various types of actuators can be included in micro-mirror assemblies 252 to provide the torque, such as an electrostatic actuator, an electromagnetic actuator, or a piezoelectric actuator. FIG. 2E illustrates examples of actuators that can be included in micro-mirror assemblies 252 to provide the torque. As shown in FIG. 2E, a pair of comb drives 261a and 261b can be positioned around, respectively, connection structures 258c and 258d. Each of comb drives 261a and 261b can include two pairs of electrodes, such as electrodes 262a and 262b and electrodes 264a and 264b for comb drive 261a. Electrodes 262a and 264a can be connected to micro-mirror 256, whereas electrodes 262b and 264b can be connected to sidewall 260a. When a voltage V1 is applied across electrodes 262a and 262b, opposite charges can accumulate, and an electrostatic force F1, defined according to the following equation, can be developed between electrodes 262a and 262b due to the accumulation of charges. Electrostatic force F1 can apply a torque and cause micro-mirror 256 to rotate in a clockwise direction.

$$F1 = -P(V1)^2. \quad \text{(Equation 3)}$$

In Equation 3, P is a constant based on permittivity, a number of fingers of the electrodes, gap between the electrodes, etc. As shown in Equation 3, the electrostatic force (and the resulting net torque) can be directly proportional to a square of applied voltage.

Moreover, when a voltage V2 is applied across electrodes 264a and 264b, an electrostatic force F2 can develop according to Equation 2. Electrostatic force F2 can also apply a torque and cause micro-mirror 256 to rotate in a counter-clockwise direction.

In some examples, a pair of piezoelectric actuators 270a and 270b, or a pair of electromagnetic devices 280a and 280b, can also be positioned on two sides of a connection structure (e.g., connection structure 258c). Each of the piezoelectric actuators 270a and 270b can expand or contract based a voltage (e.g., V1 and V2) applied to the actuators, and can create a torque to push micro-mirror 256 to rotate clockwise or counterclockwise around connection structure 258a. Moreover, each pair of electromagnetic actuators 280a and 280b can also generate an electromagnetic force based on a voltage (e.g., V1 and V2) applied to the actuators. The electromagnetic force between each pair of electromagnetic actuators 280a and 280b can also create a torque to rotate micro-mirror 256 clockwise or counter-clockwise around connection structure 258a. For both piezoelectric actuators 270a and 270b and electromagnetic actuators 280a and 280b, the net torque can be directly proportional to the applied voltage, according to the following equation:

$$F1 = -Q(V1). \quad \text{(Equation 4)}$$

In Equation 4, F1 can be the force provided by an actuator (e.g., piezoelectric actuator 270, electromagnetic actuator 280a), whereas V1 is the voltage applied to the actuator. Q can be a constant based on various physical properties of the actuator.

To rotate micro-mirror 256, a controller can set the voltages V1 and V2 to set a torque applied to micro-mirror 256 for each of comb drives 261a and 261b, piezoelectric actuators 270a and 270b, and electromagnetic devices 280a and 280, based on Equations 2 and 3.

In some examples, a mapping table can be generated based on Equations 1-4 to provide a mapping between a target rotation angle θ and the control signal (e.g., a voltage) supplied to the actuator. A controller can then refer to the mapping table to generate a control signal based on the target rotation angle and supply the control signal to control the rotation of micro-mirror 256 to rotate by the target rotation angle. In addition, the controller can supply the control signal at a frequency close to the natural frequency of micro-mirror 256 to induce harmonic resonance, which can substantially reduce the torque required to rotate the micro-mirror by the target rotation angle.

The performance of the light steering system, however, can be degraded by the limited control precision. Specifically, the controller can refer to the mapping table to generate a control signal for a given target rotation angle, but due to limited control precision, the actuator may be unable to rotate the mirror exactly by that target rotation angle. As a result, the mirror may be unable to rotate over a desired range of angle, which can reduce the achievable FOV. Moreover, due to the limited control precision, the rotation angles of each micro-mirror in the array also vary. The non-uniformity in the rotation angles of the micro-mirrors can increase the dispersion of the reflected light and reduce the imaging/ranging resolution.

The control precision limitation can come from various sources. One example source of control precision limitation comes from variations in the fabrication process. As described above, the torque required to rotate micro-mirror 256 by a target rotation angle depends on the spring constant of the connection structure. Due to variations in the fabrication process, the dimensions of the connection structure may become different from the designed values, which introduces variations in the spring constant of the connection structure. As a result, the torque required to rotate the micro-mirror by the target rotation angle may also be different from the value listed in the mapping table. As another example, the actuator may not create the target torque in response to the control signal due to various non-idealities. For example, due to electrical resistance of the transmission paths of the control signal, the amplitude of the control signal can be reduced when it arrives at the actuator. In all these cases, the actual rotation angle of the micro-mirror may not match the target rotation angle, which leads to degradation in the control precision of the micro-mirror.

Examples of Adaptive Control Signal Generation

FIG. 3A illustrates an example of a light steering system 300 that can address at least some of the issues described above. Light steering system 300 can be implemented on a semiconductor substrate to form an integrated circuit. As shown in FIG. 3A, the light steering system comprises an actuator controller 301 and an array of micro-mirror assemblies 302. Each of array of micro-mirror assemblies 302 includes connection structures 304, actuators 306, and a micro-mirror 308. Connection structures 304 can be similar to those shown in FIG. 2A-FIG. 2E and can be in the form of a spring, a torsion bar, etc. Actuators 306 can include various types of actuators, such as an electrostatic actuator, an electromagnetic actuator, and a piezoelectric actuator, as shown in FIG. 2E. In addition, one or more micro-mirror assembly of the array of micro-mirror assemblies 302, such as micro-mirror assembly 302a, can include a measurement structure 310. As to be described below, the resistance of measurement structure 310 varies with a rotation angle of the micro-mirror. Light steering system 300 further includes one or more measurement circuits 310, such as measurement circuit 312a. Each measurement circuit can measure the resistance of one or more measurement structures 310 of one or more micro-mirror assemblies 302, and output resistance measurement results 314 to actuator controller 301. The resistance measurement results can include, for example, the resistance measurement of a measurement structure of an individual micro-mirror assembly and/or a comparison result between resistances of measurement structures of multiple micro-mirror assemblies.

In addition, actuator controller 301 includes measurement processing module 316 and a control signal generation module 320. Measurement processing module 316 can process the measurement results 314 to determine, for example, an actual rotation angle 318 of a particular micro-mirror assembly and differences among the rotation angles of multiple micro-mirror assemblies. Control signal generation module 320 can receive target rotation angle information 322 (e.g., from LiDAR controller 206) to generate a control signal 332. The control signal can be in the form of a voltage to be applied to the actuator. The magnitude/frequency of control signal 332 can be determined based on a torque required to achieve the target rotation angle, and a property of the actuator that determines a relationship between the voltage and the torque, as described above in Equations 1-4. For example, control signal generation module 320 can maintain a mapping table 334 that maps different target rotation angles to different magnitudes/frequencies of control signal 332. From the mapping table, control signal generation module 320 can retrieve the magnitude/frequency of a control signal for target rotation angle 322 and generate control signal 332 according to the retrieved magnitude/frequency. Actuator controller 301 can then transmit control signal 332 to actuators 306 to rotate micro-mirror 308 by target rotation angle 322.

Referring back to micro-mirror assembly 302a, upon receiving control signal 332, actuators 306 can rotate micro-mirror 308 by an actual rotation angle 318. Actual rotation angle 318 may or may not be the same as target rotation angle 322 due to variations in the fabrication process of micro-mirror assembly 302, various non-idealities, etc., such that the actual relationship between the rotation angle and control signal is different from the mapping in mapping table 334. The difference between target rotation angle 322 and actual rotation angle 318 can represent a rotation angle error.

To reduce the rotation angle error, control signal adjustment module 340 can obtain actual rotation angle 318 and determine a relationship between actual rotation angle 318 and target rotation angle 322. The actual rotation angle 318 can be for a particular micro-mirror assembly based on a particular resistance measurement result 314, or an average of actual rotation angles 318 of multiple micro-mirrors based on an average of resistance measurement results 314. Control signal adjustment module 340 can then adjust control signal 332 to generate control signal 342 based on the relationship. For example, control signal adjustment module 340 can generate control signal 342 based on adjusting the magnitude of control signal 332 as follows:

$$\text{Signal}_{342} = \frac{\text{Target rotation angle}}{\text{Actual rotation angle}} \times \text{Signal}_{332}. \quad \text{(Equation 5)}$$

In some examples, control signal generation module 320 can also generate control signal 342 based on a slow feedback mechanism, in which control signal generation module 320 increases or decreases the amplitude of control signal 332 in predetermined steps, and obtain the updated actual rotation angle from measurement circuits 312a for each step, until the rotation angle error settles to within an error threshold.

In some examples, control signal generation module 320 can generate control signal 332 having a particular frequency. The periodic rotation of micro-mirror 308 can be performed according to scanning pattern, as shown in FIG. 2C, to rotate micro-mirror 308 across a range of angles to achieve a two-dimensional FOV. Control signal 332 can be configured to inject energy into actuators 406 at a frequency close to a presumed natural frequency of micro-mirror 308 to induce harmonic resonance, which allows substantial reduction in the required torque to achieve a range of rotation for the target FOV. But the actual range of rotation angle may become smaller than the target range of rotation angle if the frequency of control signal 332 does not match the actual natural frequency of micro-mirror 308 due to the actual natural frequency of the micro-mirror being different from the presumed natural frequency. In such a case, adjustment module 340 can obtain measurements from measurement circuit 312a to determine the range of rotation angles of micro-mirror 308 in response to control signal 332. Adjustment module 340 can then generate control signal 342 based on increasing or decreasing the frequency of control signal 332. The frequency of the control signal can be adjusted in steps until the actual range of rotation angles matches (to within an error threshold) a target range of rotation angles, which can indicate that the micro-mirror is being rotated at its natural frequency and harmonic resonance is achieved.

In some examples, adjustment module 340 can generate control signal 342 based on a comparison result between resistances of measurement structures of multiple micro-mirror assemblies. The comparison result can reflect differences among the actual rotation angles of the multiple micro-mirror assemblies at any given time. To ensure the rotations of the micro-mirrors are synchronized, adjustment module 340 can adjust control signal 332 to one or more micro-mirror assemblies to minimize the differences among the actual rotation angles of the multiple micro-mirror assemblies. For example, the comparison result may indicate that a first micro-mirror rotates by a larger angle than a second micro-mirror. Various adjustments can be made to the control signals based on the comparison result. In one example, adjustment module 340 can adjust the control signal (e.g., by reducing its amplitude and/or frequency) to the first micro-mirror to reduce its rotation angle to match the rotation angle of the second micro-mirror. In another example, adjustment module 340 can adjust the control signal to the second micro-mirror (e.g., by increasing its amplitude and/or frequency) to increase its rotation angle to match the rotation angle of the first micro-mirror. In yet another example, adjustment module 340 can adjust the control signal to the first micro-mirror to reduce the rotation angle of the first micro-mirror, and adjust the control signal to the second micro-mirror to increase the rotation angle of the second micro-mirror, until the rotation angles of both micro-mirror reaches an average rotation angle.

FIG. 3B illustrates an example of micro-mirror assembly 302a having a measurement structure 310, as well as an electrical model 344 representing the micro-mirror assembly. As shown on the left of FIG. 3B, micro-mirror 308 (which can include a reflecting surface, or a gimbal surrounding the reflecting surface) can be connected to a semiconductor substrate 350 via a pair of connection structures 304a and 304b, which allows micro-mirror 308 to rotate around a rotation axis 352. In addition, measurement structure 310 can include an axial portion 354 and a link portion 356. Axial portion 354 can be connected to substrate 350. Axial portion 354 is also connected to electrical contacts 358a (also labelled "S0") and 358b (also labelled "S1") on substrate 350. The electrical contacts are accessible to measurement circuit 312 to measure the resistance of measurement structure 310. In addition, a first end of link portion 356 is connected to axial portion 354, whereas a second end of link portion 356 is connected to micro-mirror 308. Measurement structure 310 and micro-mirror 308 can be formed in a single silicon structure.

In some examples, axial portion 354 of measurement structure 310 can provide an electrical conduction path parallel with rotation axis 352 of micro-mirror 308. Moreover, link portion 356 can provide another conduction path along a direction perpendicular to the rotation axis. The resistances of the conduction paths of measurement structure 310 and micro-mirror 308 are represented in electrical model 344. In electrical model 344, variable resistances RS1 and RS2 represent the resistance of the conduction path in axial portion 354 and/or link portion 356 that varies with the rotation angle. The variation in the resistances RS1 and RS2 can be due to the stresses received by axial portion 354 and link portion 356 as micro-mirror rotate. The conduction path is accessible via electrical contacts 360a and 360b to measure the total of resistances RS1 and RS2, which can reflect the rotation angle. In addition, resistances RL and RM represent other conduction paths formed in link portion 356, micro-mirror 308, and connection structures 304a/304b and are connected to a COM terminal, which is typically grounded. Resistances RL and RM typically do not conduct current away from electrical contacts S0 and S1 and are not measured to determine the rotation angle. The capacitance CBC can represent a variable capacitance of actuator 306 (not shown in FIG. 3B), such as a capacitance between a pair of comb drives driven by an AC bias voltage. Capacitance CBC varies according to the separation between the comb drives as the micro-mirror rotates.

FIG. 3C illustrates a side-view of measurement structure 310, micro-mirror 308, connection structures 304, and substrate 350 in different rotation states. As shown in FIG. 3C, in state 360, micro-mirror 308 is at its default position having zero rotation angle. Both axial portion 354 and link portion 356 experience no stress and no deformation.

In state 370, micro-mirror 308 rotates clockwise by an angle θ. As a result of the clockwise rotation, an end of micro-mirror 308 that connects with link portion 356 moves up, which causes link portion 356 to bend up. An upper surface 371 of link portion 356 can receive a compression stress 372 that compresses the upper surface. Moreover, as link portion 356 is pulled away from axial portion 354, link portion 356 can also exert a shear stress 374 and a normal stress 376 onto axial portion 354.

On the other hand, in state 380, micro-mirror 308 rotates counter-clockwise by an angle θ. As a result of the counter-clockwise rotation, the end of micro-mirror 308 that connects with link portion 356 moves down, which causes link portion 356 to bend down. Upper surface 371 of link portion 356 can receive a tensile stress 382 that stretches the upper surface. Moreover, as link portion 356 is also pulled away from axial portion 354, link portion 356 can also exert shear stress 374 and normal stress 376 onto axial portion 354.

The different stresses can change the electrical resistances of axial portion 354 and link portion 356, represented by the variable resistances RS1 and RS2 in electrical model 344 of FIG. 3C. A change in electrical resistance ΔR can be related to the resistivity ρ and permittivity ε of connection structure 304a (e.g., silicon) as follows:

$$\frac{\Delta R}{R} = (1+2)\varepsilon + \frac{\Delta \rho}{\rho}. \quad \text{(Equation 6)}$$

The resistivity ρ can depend on the electrical current, stress, and crystallographic orientation of the material of axial portion 354 and link portion 356, which is typically silicon. A general matrix representation for a family of directions of a silicon single crystal can be expressed as:

$$\frac{1}{\rho_0}\begin{bmatrix} \Delta\rho_{11} \\ \Delta\rho_{22} \\ \Delta\rho_{33} \\ \Delta\rho_{23} \\ \Delta\rho_{13} \\ \Delta\rho_{12} \end{bmatrix} = \begin{bmatrix} \pi_{11} & \pi_{12} & \pi_{12} & 0 & 0 & 0 \\ \pi_{12} & \pi_{22} & \pi_{12} & 0 & 0 & 0 \\ \pi_{12} & \pi_{12} & \pi_{33} & 0 & 0 & 0 \\ 0 & 0 & 0 & \pi_{44} & 0 & 0 \\ 0 & 0 & 0 & 0 & \pi_{44} & 0 \\ 0 & 0 & 0 & 0 & 0 & \pi_{44} \end{bmatrix} \begin{bmatrix} \sigma_{xx} \\ \sigma_{yy} \\ \sigma_{zz} \\ \tau_{yz} \\ \tau_{xz} \\ \tau_{xy} \end{bmatrix}. \quad \text{(Equation 7)}$$

In Equation 7, $\sigma_{xx}$, $\sigma_{yy}$, and $\sigma^{zz}$ refer to normal stresses along the x, y and z axes, whereas the $\tau_{yz}$, $\tau_{xz}$, and $\tau_{xy}$ refer to shear stresses between the y-z axes, x-z axes, and x-y axes. The parameters $\Delta\rho_{11}$, $\Delta\rho_{22}$, $\Delta\rho_{33}$, $\Delta\rho_{23}$, $\Delta\rho_{13}$, and $\Delta\rho_{12}$ refer to changes in resistivity along different crystallographic orientations. For example, $\Delta\rho\_11$ can refer to the resistivity change with stress applied in direction 1 and measured across direction 1, whereas $\Delta\rho\_21$ can refer to the resistivity change with stress applied in direction 2, with direction 1 aligned with the x-axis and direction 2 aligned with the y-axis. The parameter $\rho_0$ can refer to the original resistivity of silicon without the effect of stress. A matrix of π parameters can transform a matrix of normal and shear stresses to a matrix of resistivity changes.

A more general equation that describes a relationship between resistance and stress is as follows:

$$\frac{\Delta R}{R} = \pi_l \times \sigma_l + \pi_t \times \sigma_t \quad \text{(Equation 8)}$$

In Equation 8, $\pi_l$ can be an equivalent longitudinal coefficient, $\sigma_l$ can be an equivalent longitudinal stress, $\pi_t$ can be an equivalent transverse stress, whereas $\sigma_t$ can be an equivalent transverse stress.

As shown in FIG. 3C, the directions and magnitudes of the different types of stresses (shear stress, normal stress, tensile stress, and compression stress) can be a function of the rotation angle, and the rotation angle can be determined based on the electrical resistance of measurement structure 310 as a result of the stresses. For example, a larger shear stress and normal stress on axial portion 354, regardless of their directions, can increase the resistivity of axial portion 354. As a result, the resistance of axial portion 354 can increase with the rotation angle θ, regardless of the rotation direction. On the other hand, compression stress and tensile stress can have opposite effects on the resistivity of link portion 356. Therefore, the resistance of link portion 356 is both a function of the rotation angle θ as well as the rotation direction. If axial portion 354 and link portion 356 have similar contributions to the variable resistances RS1 and RS2, the total resistance RS1 and RS2 between electrical contacts 360a and 360b (S0 and S1) may become a complex function of rotation angle θ and not necessarily linearly related to the rotation angle.

FIG. 3D illustrates a top view of array of micro-mirror assemblies 302, some of which includes measurement structure 310 formed on semiconductor substrate 350. In the example shown in FIG. 3D, four micro-mirror assemblies 302 on four corners of the array, denoted by $M_{11}$, $M_{m1}$, $M_{1n}$, and $M_{mn}$, can have measurement structure 310 and sensing terminals S0 and S1. In some examples, each micro-mirror assembly within the array can have measurement structure 310 and sensing terminals S0 and S1. Each micro-mirror assembly include a pair of comb drives 392 and 394 as actuators to rotate micro-mirror 308. The comb drives can be controlled by the a voltage between the Bias terminal and the COM terminal.

To reduce complexity of rotation angle determination based on the resistance of measurement structure, it is desirable to configure measurement structure 310 such that the variable resistances RS1 and RS2 are dominated by one of axial portion 354 or link portion 356, but not both. Moreover, the configuration can also amplify the resistance change with respect to the rotation angle, which can increase the signal-to-noise ratio and improve the accuracy of actual rotation angle determination. On the other hand, given that measurement structure 310 does not provide physical support to micro-mirror 308 and also does not affect the rotation of micro-mirror 308, the configuration of measurement structure 310 typically do not affect the rotation properties (e.g., rotation frequency, range) of micro-mirror 308.

FIG. 4A-FIG. 4D illustrate additional examples of measurement structures 310 having resistance-amplifying configurations and their properties. In FIG. 4A, current can flow from electrical contact S0 along a direct conduction path 402 in axial portion 354 to electrical contact S1, and does not flow towards micro-mirror 308. The resistance of conduction path 402, provided by axial portion 354, under the normal stress and the shear stress is to be measured to determine the angle of rotation. Axial portion 354 can be configured to increase its contribution to the variable resistance RS1 and RS2 of conduction path 402 such that the rotation angle can be determined based on a relationship between normal/shear stresses and resistance, and a relationship between rotation angles and normal/shear stresses.

Various techniques can be employed to increase the resistance of axial portion 354. Specifically, the width of axial portion 354 (labelled by "w") can be narrowed to increase the resistance of the conduction path between electrical contacts S0 and S1 along axial portion 354. In addition, axial portion 354 can be doped with a dopant (e.g., Boron, Phosphorus, Arsenic, etc.) to introduce asymmetry in the resistance of axial portion 354, which can amplify the resistance change with respect to stress. These arrangements allow the resistance of conduction path 402 to be contributed mostly by the shear/normal stresses of link portion 354. Moreover, the resistance change of axial portion 354 with respect to the rotation angle can be amplified to increase the signal-to-noise ratio.

In addition, link portion 356 can have a fork-like structure comprising multiple branches/tines including tines 404a, 404b, and 404c, with only tine 404b connected to micro-mirror 308. Link portion 356 can be coated with an anti-reflection layer to cover the substrate and to prevent the substrate from reflecting light, which can improve the optical efficiency of micro-mirror 308. In addition, by connecting only one of the tines to micro-mirror 308, the mechanical impedance of link portion 356 on the movement of link portion 356 can be reduced. All these can improve the performance of the micro-mirror assembly.

FIG. 4B illustrates a chart 410 including a graph 412 illustrating the variations of rotation angles of micro-mirror 308, with respect to time, and a graph 414 illustrating a resistance change (ΔR/R) of conduction path 402, with respect to time. Graphs 412 and 414 can correspond to micro-mirror 308 rotating in an oscillatory pattern. As shown in FIG. 4B, the resistance change is linear to the rotation angle of the angle, with minimum resistance change (zero) when rotation angle is at zero. The resistance change is at maximum (0.07) when the magnitude of the rotation angle is at maximum (0.07). A rotation angle of 0.07 in both clockwise (+0.07) and counterclockwise (−0.07) directions can lead to the same resistance change. Referring back to FIG. 3C, this is because axial portion 354 receives the same normal stress and shear stress when micro-mirror 308 rotates in the clockwise and counterclockwise directions by the same rotation angle. As a result, while both the changes of resistance and the rotation angle follow oscillatory patterns, the frequency of the resistance change is twice of the frequency of the rotation angle change.

FIG. 4C illustrates another example of measurement structure 310. In FIG. 4C, measurement structure 310 can be configured such that the current from electrical contact S0 flows through a conduction path 420 through axial portion 354 and part of link portion 356. Specifically, axial portion 354 can include an opening 422 that extends into link portion 354, which forces the current to detour into link portion 354. As link portion 354 experiences a tensile stress or a compression stress as micro-mirror 308 rotates, the resistance change of conduction path 420 can also reflect the actual rotation angle of micro-mirror 308. In addition, in some examples, link portion 356 can have a fork-like structure, as in FIG. 4A, which can be coated with an anti-reflection layer to reduce reflection of light by the substrate and to improve the optical efficiency of the micro-mirror. Moreover, only one of the branches of the fork-like structure of link portion 356 is connected to micro-mirror 308 to reduce the link portion's mechanical impedance on the micro-mirror.

As explained above, as the resistance varies differently with respect to the tensile/compression stresses received by link portion 356 and with respect to the shear/normal stresses received by axial portion 354, configuring measurement structure 310 such that only one of link portion 356 or axial portion 354 dominates the resistance can simplify the rotation angle determination operation. In FIG. 4C, various techniques can be employed to ensure that the variable resistances RS1 and RS2 of conduction path 420 are dominated by the tensile/compression stresses received by link portion 356. For example, the portions of conductive path 420 in link portion 356 can be made narrow and/or doped with a dopant (e.g., Boron, Phosphorus, Arsenic, etc.) to introduce asymmetry in the resistance of link portion 356), while the portions of conductive path 420 in axial portion 354 can be coated with a metal layer to reduce their resistivity. With these arrangements, the resistance of conduction path 420, measured between electrical contacts S0 and S1, can be contributed mostly by the tensile or compression stresses, and the asymmetry can amplify the resistance change of axial portion 354 with respect to stress. Therefore, the rotation angle can be determined based on a relationship between resistance and tensile/compression stresses, and based on a relationship between rotation angles and tensile/compression stresses. In addition, as the resistance change with respect to rotation angles is amplified, the signal-to-noise ration can improve as well.

Figure 4D:
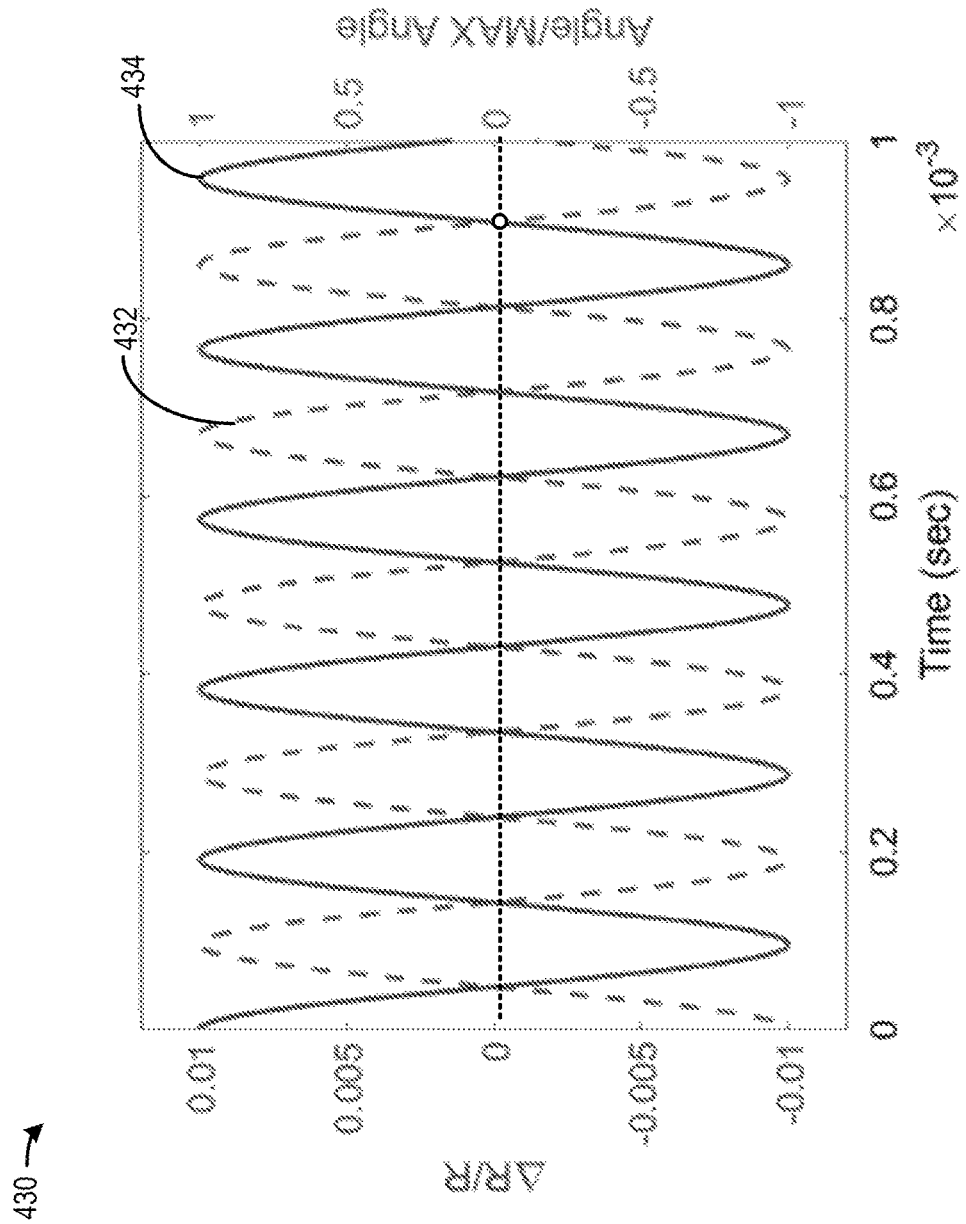

FIG. 4D illustrates a chart 430 including a graph 432 illustrating the variations of rotation angles of micro-mirror 308, with respect to time, and a graph 434 illustrating a resistance change ($\Delta R/R$) of conduction path 402, with respect to time. Graphs 432 and 434 can correspond to micro-mirror 308 rotating in an oscillatory pattern. As shown in FIG. 4D, the resistance change is linear to the rotation angle of the angle, with minimum resistance change (zero) when rotation angle is at zero. The resistance change can be positive (the resistance increases) when the micro-mirror rotates counter-clockwise and have a negative rotation angle. The resistance change can be negative (the resistance decreases) when the micro-mirror rotates clockwise and have a positive rotation angle. As a result, the resistance measurement results can be proportional to (e.g., a one-to-one correspondence, a polynomial relationship, etc.) the actual rotation angle of the micro-mirror. In addition, as the resistance change and the rotation of the micro-mirror can have the same frequency. The proportional relationship allows both the magnitude and the direction of a rotation angle of the micro-mirror to be determined directly from a particular resistance measurement result, without the need to separately track the direction of rotation of the micro-mirror. This allows resistance measurement results to track the rotation angles more closely, such that the resistance measurements results are linearly related to the actual rotation angles.

FIG. 5A-FIG. 5E illustrate examples of components of measurement circuit 312 and measurement processing module 316. As described above, measurement circuit 312 can measure the total resistance RS1 and RS2 of a conduction path (e.g., conduction paths 402 and 420) in measurement structure 310 between electrical contacts S0 and S1 and output a measurement result, whereas measurement processing module 316 can process the measurement result from measurement circuit 312. Referring to FIG. 5A, measurement circuit 312 can include a stimulus generator 502 and a network of resistors 504 comprising resistors R1, R2, and $R_{ref}$. Resistor $R_{ref}$ can be a reference resistor to compare with the total resistance RS1 and RS2 of measurement structure 310. The resistors R1 and R2 can be chosen to be equal to or larger than $R_{ref}$ and $R_{B1}+R_{B2}$ (e.g., 20% larger). Network of resistors 504 can be connected to electrical contacts S0 and S1, and with measurement structure 310 (represented by a resistor labeled "RS1+RS2") to form a bridge structure. The S1 electrical contact can also be connected to a grounding structure.

Stimulus generator 502 can supply a voltage across the bridge structure, which causes current to flow through a first branch comprising resistors R2 and $R_{ref}$, and through a second branch comprising resistors R1 and RS1+RS2. An output voltage VOUT can be generated between electrical contact S0, and an electrical contact S2 (between resistors R2 and $R_{ref}$). The output voltage can be amplified by an amplifier 506 of measurement circuit 312. The output voltage VOUT can represent a relationship between electrical resistances RS1+RS2 and $R_{ref}$. With the bridge structure, a differential output voltage VOUT can be obtained to eliminate DC offset. In some examples, resistors R2 and $R_{ref}$ can be omitted, and electrical resistances RS1+RS2 and R1 can form a voltage divider structure. In such examples, output voltage VOUT can be measured at the S0 electrical contact to represent a relationship between electrical resistances R1 and RS1+RS2. In both cases, by measuring VOUT, the total resistance of the a conduction path between electrical contacts S0 and S2, and the rotation angle of micro-mirror 308, can be determined.

FIG. 5B illustrates examples of components of measurement processing module 316. Referring to FIG. 5B, measurement processing module 316 further includes an analog-to-digital converter (ADC) 522, a mapping table 524, and output circuit 526. ADC 522 can receive the amplified output voltage VOUT from amplifier 506, quantize the amplified output voltage to a digital value, and provide the digital value to output circuit 526. Mapping table 524 can maintain a mapping between digital values and rotation angles. With an input digital value from ADC 522, output circuit 526 can access mapping table 524 to retrieve the rotation angle mapped to the input digital value and output the rotation angle as actual rotation angle 318.

Referring to FIG. 5C, in some examples, the bridge circuit in measurement circuit 312 can be configured to generate the output voltage VOUT based on comparing the resistances of the measurement structures of two micro-mirror assemblies. The resistances among the measurement structures of the two micro-mirror assemblies can be compared to determine, for example, a degree of synchronization of rotation among the micro-mirror assemblies. For example, in FIG. 5C, measurement circuit 310a can include a bridge circuit 530a configured as a half-bridge circuit, and a stimulus generator 502a to supply a voltage to bridge circuit 530a. Bridge circuit 530a can include a measurement structure 310a of micro-mirror assembly 302a and a measurement structure 310b of micro-mirror assembly 302b in two different branches, with each branch outputting a voltage representing a relationship between $R_{ref}$ and the resistance RS1+RS2 of the respective measurement structure. Micro-mirror assemblies 302a and 302b can be of the same row or of the same column. The output voltage VOUT of bridge circuit 530a can represent a comparison between the resistances RS1+RS2 of measurement structures 310a and 310b and can be amplified by amplifier 506a. Light steering system 300 can also include a measurement circuit 310b, which includes a stimulus generator 502b, a bridge circuit 530b to compare between the resistances RS1+RS2 of a measurement structure 310c of a micro-mirror assembly 302c and of a measurement structure 310d of a micro-mirror assembly 302d, and an amplifier 506b to amplify the comparison output. Micro-mirror assemblies 302c and 302d can be of the same row or of the same column, but in a different row/column from micro-mirror assemblies 302a and 302b. With such arrangements, a degree of synchronization of rotations within a row/column of the array of micro-mirror assemblies can be determined, and the degree of synchronization can be determined for different rows/columns. Referring back to FIG. 3D, micro-mirror assemblies 302a and 302b can correspond to micro-mirror assemblies denoted $M_{11}$ and $M_{m1}$, whereas micro-mirror assemblies 302c and 302d can correspond to micro-mirror assemblies denoted $M_{1n}$ and $M_{mn}$.

Referring to FIG. 5D, in some examples, the bridge circuit in measurement circuit 312 can be configured to generate the output voltage VOUT based on comparing the resistances of the measurement structures of four micro-mirror assemblies. In FIG. 5D, measurement circuit 310 can include a bridge circuit 540 configured as a full-bridge circuit. Bridge circuit 540 can include a measurement structure 310a of micro-mirror assembly 302a and a measurement structure 310b of micro-mirror assembly 302b in a first branch, and a measurement structure 310c of micro-mirror assembly 302c and a measurement structure 310d of micro-mirror assembly 302d in a second branch. The first branch can output a first voltage representing a relationship between the resistances RS1+RS2 of measurement structures 310a and 310b, whereas the second branch can output a second voltage representing a relationship between the resistances RS1+RS2 of measurement structures 310c and 310d. The output voltage VOUT of bridge circuit 540 can represent a comparison of the resistances RS1+RS2 among measurement structures 310a, 310b, 310c, and 310d.

In some examples, only a subset of the micro-mirror assemblies include measurement structures 310 to support the measurements by the measurement circuits 312 of FIG. 5C and FIG. 5D. For example, a pair of micro-mirror assemblies are selected in each row/column to include a measurement structure 310 and electrical contacts S0 and S1, and a measurement circuit 312 is provided, for each row/column, to compare the resistances of measurement structures 310 of a pair of micro-mirror assemblies in the respective row/column, as in FIG. 5C. As another example, only four micro-mirror assemblies (e.g., in the four corners of the array of micro-mirror assemblies) are selected to include a measurement structure 310 and electrical contacts S0 and S1, and a single measurement circuit 312 is provided to compare the resistances of measurement structures 310 of the four micro-mirror assemblies. Such arrangements can reduce the complexity and footprint of the micro-mirror assemblies.

Method

FIG. 6 illustrates a method 600 for performing light steering operation using a mirror assembly of a light steering system, such as mirror assembly 302 of light steering system 300 of FIG. 3A-FIG. 5D. The micro-mirror assembly is part of an MEMS implemented on a substrate, such as substrate 255. The micro-mirror assembly comprises a micro-mirror (e.g., micro-mirror 308), a first connection structure (e.g., connection structures 304a), and a second connection structure (e.g., connection structures 304b), the first connection structure being mechanically connected to the substrate at a first pivot point (e.g., connection points 305a), the second connection structure being mechanically connected to the substrate at a second pivot point (e.g., connection points 305b). One or more micro-mirror assemblies of the array of micro-mirror assemblies further include a measurement structure connected to the micro-mirror, such as measurement structure 310, an electrical resistance of the measurement structure being variable based on a rotation angle of the micro-mirror, as shown in FIG. 4A-FIG. 4D. The light steering system may further include a measurement circuit, such as measurement circuit 312 show in FIG. 5A-FIG. 5D, to measure the electrical resistance. Method 600 can be performed by a controller, such as actuator controller 301, in conjunction with other components of micro-mirror assembly 302a, such as actuators 306 and measurement circuit 310.

In operation 602, the controller determines a first signal based on a target rotation angle of the micro-mirror. The first signal can be in the form of a voltage to be applied to the actuator. The magnitude/frequency of the first signal can be determined based on a torque required to achieve the target rotation angle, and a property of the actuator that determines a relationship between the voltage and the torque, as described above in Equations 1-4.

In operation 604, the controller can transmit the first signal to the actuator of the micro-mirror assembly to rotate the micro-mirror by the target angle. The actuator rotates the micro-mirror via, for example, an electrostatic force (e.g., a comb drive) or a mechanical push/pull force (e.g., a piezoelectric device).

In operation 606, the controller can obtain, from the measurement circuit, measurements of the electrical resistance of the measurement structure of the one or more micro-mirror assemblies to determine a rotation angle of the micro-mirror of the one or more micro-mirror assemblies in response to the first signal.

In some examples, the measurement circuit can include a bridge circuit, a stimulus generator, and an amplifier. The bridge circuit can include a network of resistors that is electrically connected across the two substrate electrical contacts. The network of resistors can include a reference resistor, a first resistor, and a second resistor. The bridge circuit can include two branches, with a first branch including the reference resistor connected in series with a first resistor, and a second branch including the second resistor connected in series with the measurement structure. To measure the electrical resistance of the conductive path in the measurement structure, the stimulus generator can supply an input voltage signal to the bridge circuit, which causes currents to flow through the two branches. An output voltage signal can be generated between the two branches. The output voltage signal can reflect a relationship between the electrical resistance of the reference resistor and the electrical resistance of the conductive path of the measurement structure.

In some examples, the bridge circuit is configured to generate the output voltage based on comparing the resistances of the measurement structures of multiple micro-mirror assemblies. The output voltage can be used to determine a degree of synchronization of rotation among the multiple micro-mirror assemblies. Each of the two branches of the bridge circuit can include a measurement structure of a micro-mirror assembly, such that two measurement structures of two different micro-mirror assemblies are included in the bridge circuit. The output voltage generated by the bridge circuit can indicate a relationship between the resistances of the two measurement structures, as well as how these resistances compare with a reference resistance. In some examples, each measurement circuit can be used to measure the resistances of the measurement structures of two micro-mirror assembles within one row/column of the array of micro-mirror assemblies. The output voltages of the bridge circuits allow the controller to determine a degree of synchronization of rotation among and between each row/column of the array of micro-mirror assemblies.

As another example, the bridge circuit can include two measurement structures in each of the two branches, so that the output voltage generated by the bridge circuit can indicate a relationship among the resistances of the four measurement structures. The four measurement structures can be in four micro-mirror assemblies on four corners of the array of micro-mirror assemblies.

In operation 608, the controller can determine, based on the measurement of the electrical resistance, whether the micro-mirror rotates by the target angle in response to the first signal. The determination can be based on comparing the voltage from the bridge/voltage divider with a predetermined voltage for the target angle. A difference (if any) between the actual rotation angle of the micro-mirror and the target angle can also be determined.

In operation 610, the controller can determine a second signal based on the first signal and based on whether the micro-mirror rotates by the target angle. For example, the second signal can be determined based on adjusting the first signal until the difference between the actual rotation angle and the target angle falls below a threshold. In some examples, the adjustment of the control signal can include adjusting an amplitude of the control signal to adjust the torque provided by the actuator. In some examples, the micro-mirror may be rotated according to a periodic pattern. For example, the micro-mirror can be rotated at a frequency close to a natural frequency between a range of angles to induce harmonic resonance, which allows substantial reduction in the required torque to achieve a target FOV. In such a case, the adjustment of the control signal can include adjusting the frequency of the control signal.

In operation 612, the controller can transmit the second signal to the actuator of the micro-mirror assembly to cause the micro-mirror to rotate by the target angle. The controller can then obtain another measurement of the actual rotation angle of the micro-mirror and adjust the second signal to further reduce the difference between the actual rotation angle and the target angle.

The controller can implement a feedback loop based on the measurement of electrical resistance from the measurement circuit. In one example, the controller can determine, based on the electrical resistance measurement result provided by the measurement circuit, the actual rotation angle of the micro-mirror. The controller can then generate a second signal by adjusting the first signal to reduce a difference between the actual rotation angle and the target rotation angle, until the difference is below a threshold. In some examples, the adjustment of the first signal can include adjusting an amplitude of the first signal to adjust the torque provided by the actuator. In some examples, the micro-mirror may be rotated according to a periodic pattern. For example, the micro-mirror can be rotated at a frequency close to a natural frequency between a range of angles to induce harmonic resonance, which allows substantial reduction in the required torque to achieve a target FOV. In such a case, the adjustment of the first signal can include adjusting the frequency of the first signal.

Computing System

Figure 7:
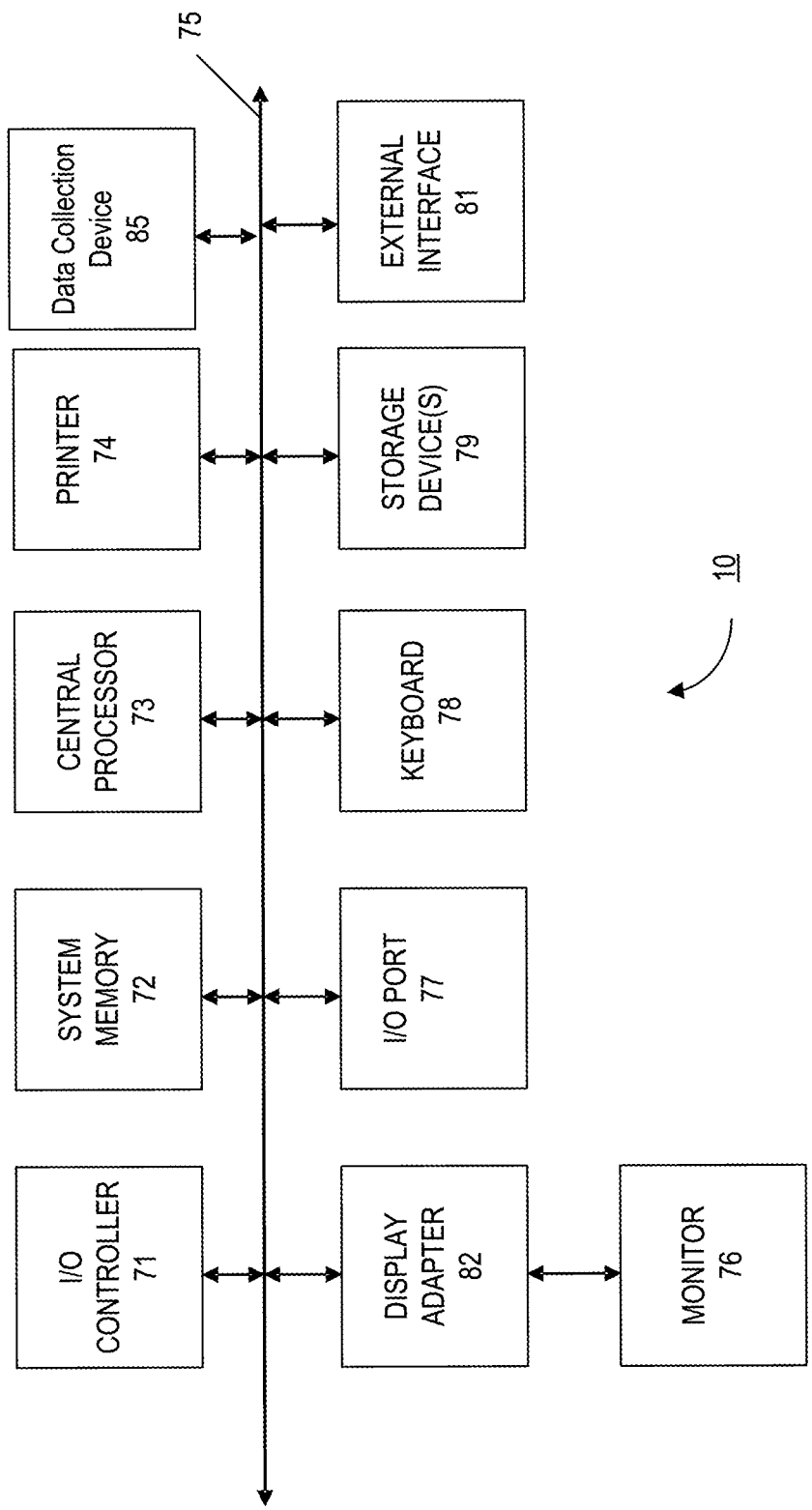
FIG. 7 illustrates an example computer system that may be utilized to implement techniques disclosed herein.

Any of the computing systems mentioned herein may utilize any suitable number of subsystems. Examples of such subsystems are shown in FIG. 7, in computing system 10. In some embodiments, a computing system includes a single computing apparatus, where the subsystems can be the components of the computing apparatus. In other embodiments, a computing system can include multiple computing apparatuses, each being a subsystem, with internal components. Computing system 10 can include, for example, a field-programmable gate array (FPGA), an application-specific integrated circuit (ASIC), and a general-purpose central processing unit (CPU), to implement the disclosed techniques, including the techniques described from FIG. 1-FIG. 6, such as actuator controller 301. In some examples, computing system 10 can also include desktop and laptop computers, tablets, mobile phones, and other mobile devices.

The subsystems shown in FIG. 7 are interconnected via a system bus 75. Additional subsystems such as a printer 74, keyboard 78, storage device(s) 79, monitor 76 which is coupled to display adapter 82, and others are shown. Peripherals and input/output (I/O) devices, which couple to I/O controller 71, can be connected to the computing system by any number of means known in the art, such as I/O port 77 (e.g., USB, FireWire®). For example, I/O port 77 or external interface 81 (e.g., Ethernet or Wi-Fi) can be used to connect computing system 10 to a wide-area network such as the Internet, a mouse input device, or a scanner. The interconnection via system bus 75 allows the central processor 73, which can be an FPGA, an ASIC, a CPU, etc., to communicate with each subsystem and to control the execution of a plurality of instructions from system memory 72 or the storage device(s) 79 (e.g., a fixed disk, such as a hard drive or optical disk), as well as the exchange of information between subsystems. The system memory 72 and/or the storage device(s) 79 may embody a computer-readable medium. Another subsystem is a data collection device 85, such as a camera, microphone, accelerometer, and the like. Any of the data mentioned herein can be output from one component to another component and can be output to the user.

A computing system can include a plurality of the same components or subsystems, e.g., connected together by external interface 81 or by an internal interface. In some embodiments, computing systems, subsystems, or apparatuses can communicate over a network. In such instances, one computer can be considered a client and another computer a server, where each can be part of a same computing system. A client and a server can each include multiple systems, subsystems, or components.

Aspects of embodiments can be implemented in the form of control-logic-using hardware (e.g., an ASIC or FPGA) and/or using computer software with a generally programmable processor in a modular or integrated manner. As used herein, a processor includes a single-core processor, a multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language, such as, for example, Java, C, C++, C#, Objective-C, Swift, or scripting language such as Perl or Python using, for example, conventional or object-oriented techniques. The software code may be stored as a series of instructions or commands on a computer-readable medium for storage and/or transmission. A suitable non-transitory computer-readable medium can include random access memory (RAM), a read-only memory (ROM), a magnetic medium such as a hard-drive or a floppy disk, or an optical medium such as a compact disk (CD) or digital versatile disk (DVD), flash memory, and the like. The computer-readable medium may be any combination of such storage or transmission devices.

Such programs may also be encoded and transmitted using carrier signals adapted for transmission via wired, optical, and/or wireless networks conforming to a variety of protocols, including the Internet. As such, a computer-readable medium may be created using a data signal encoded with such programs. Computer-readable media encoded with the program code may be packaged with a compatible device or provided separately from other devices (e.g., via Internet download). Any such computer-readable medium may reside on or within a single computer product (e.g. a hard drive, a CD, or an entire computing system), and may be present on or within different computer products within a system or network. A computing system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims. For instance, any of the embodiments, alternative embodiments, etc., and the concepts thereof may be applied to any other embodiments described and/or within the spirit and scope of the disclosure.

The use of the terms "a," "an," and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning including, but not limited to) unless otherwise noted. The term "connected" is to be construed as partly or wholly contained within, attached to, or joined together, even if there is something intervening. The phrase "based on" should be understood to be open-ended and not limiting in any way and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

What is claimed is:

1. An apparatus comprising a light detection and ranging (LiDAR) module, the LiDAR module including:
   a semiconductor integrated circuit, the semiconductor integrated circuit including a microelectromechanical system (MEMS), a substrate on which the MEMS is formed, and one or more measurement circuits, the MEMS including an array of micro-mirror assemblies, each micro-mirror assembly including:
      a micro-mirror comprising a first connection structure and a second connection structure, the first connection structure being connected to the substrate at a first pivot point, the second connection structure being connected to the substrate at a second pivot point; and
      an actuator configured to rotate the micro-mirror to reflect light emitted by a light source out of the LiDAR module or to reflect light received by the LiDAR module to a receiver;
   wherein one or more micro-mirror assemblies of the array of micro-mirror assemblies further includes a measurement structure connected to the micro-mirror, an electrical resistance of the measurement structure being variable based on a rotation angle of the micro-mirror;
   wherein the one or more measurement circuits are configured to:
      determine the electrical resistance of the measurement structure of the one or more micro-mirror assemblies; and
      provide the determined electrical resistance to enable measurement of a rotation angle of the micro-mirror of the one or more micro-mirror assemblies.

2. The apparatus of claim 1, wherein the measurement structure comprises an axial portion and a link portion;
   wherein the axial portion is connected to the substrate; and
   wherein the link portion is connected between the axial portion and the micro-mirror.

3. The apparatus of claim 2, wherein a first end of the axial portion is connected to a first electrical contact on the substrate;
   a second end of the axial portion is connected to a second electrical contact on the substrate; and
   wherein a measurement circuit of the one or more measurement circuit is electrically connected to the first electrical contact and the second electrical contact to measure an electrical resistance of the measurement structure of one of the one or more micro-mirror assemblies.

4. The apparatus of claim 3, wherein the axial portion is parallel with a rotation axis of the micro-mirror; and
   wherein the link portion is perpendicular to the rotation axis of the micro-mirror.

5. The apparatus of claim 3, wherein the measurement structure is configured to provide a current conduction path that traverses directly across the axial portion between the first electrical contact and the second electrical contact.

6. The apparatus of claim 5, wherein the axial portion has a higher resistivity than the link portion.

7. The apparatus of claim 6, wherein the axial portion is doped with a dopant that increases the resistivity of the axial portion relative to the link portion.

8. The apparatus of claim 3, wherein the measurement structure is configured to provide a current conduction path that traverses across the axial portion and at least a part of the link portion between the first electrical contact and the second electrical contact.

9. The apparatus of claim 8, wherein the measurement structure comprises an opening between a first part of the axial portion and a second part of the axial portion; and wherein the first part of the axial portion and the second part of the axial portion are connected to at least a part of the link portion.

10. The apparatus of claim 9, wherein the first part of the axial portion and the second part of the axial portion are coated with a metal layer; and wherein the at least a part of the link portion is doped with a dopant to increase a resistivity of the at least at part of the link portion.

11. The apparatus of claim 2, wherein the link portion comprises a fork structure including a plurality of tine structures; and wherein the link portion is connected to the micro-mirror at one of the plurality of tine structures.

12. The apparatus of claim 2, wherein the link portion is coated with an anti-reflection layer.

13. The apparatus of claim 1, further comprising a controller;

wherein the controller is configured to:
determine, for each micro-mirror assembly, a first signal based on a target rotation angle of the micro-mirror;
transmit the first signal to the actuator of each micro-mirror assembly;
obtain, from the one or more measurement circuits, measurements of the electrical resistance of the measurement structure of the one or more micro-mirror assemblies;
determine, for each micro-mirror assembly, a second signal based on the measurements; and
transmit the second signal to the actuator of the respective micro-mirror assembly.

14. The apparatus of claim 13, wherein the controller is configured to:
determine, based on the measurements of the electrical resistance of the measurement structure of the one or more micro-mirror assemblies, actual rotation angles of the micro-mirror of the one or more micro-mirror assemblies;
determine differences between the actual rotation angles and the target rotation angle; and
determine the second signal for the one or more micro-mirror assemblies based on the differences.

15. The apparatus of claim 13, wherein a measurement circuit of the one or more measurement circuits is configured to output a third signal representing a difference between the electrical resistances of the measurement structures of a first micro-mirror assembly and a second micro-mirror assembly of the one or more micro-mirror assemblies; and wherein the controller is configured to determine, based on the third signal, the second signal for the first micro-mirror assembly and for the second micro-mirror assembly to reduce the difference.

16. The apparatus of claim 13, wherein a measurement circuit of the one or more measurement circuits is configured to output a third signal representing a difference among the electrical resistances of the measurement structures of a first micro-mirror assembly, a second micro-mirror assembly, a third micro-mirror assembly, and a fourth micro-mirror assembly of the one or more micro-mirror assemblies; and wherein the controller is configured to determine, based on the third signal, the second signal for the first micro-mirror assembly, the second micro-mirror assembly, the third micro-mirror assembly, and the fourth micro-mirror assembly to reduce the difference.

17. The apparatus of claim 13, wherein each of the one or more measurement circuits comprises a bridge circuit.

18. The apparatus of claim 1, wherein the actuator comprises one of: an electrostatic actuator, an electromagnetic actuator, or a piezoelectric actuator.

19. A method comprising:
determining a first signal based on a target rotation angle of a micro-mirror of one or more micro-mirror assemblies of an array of micro-mirror assemblies, the array of micro-mirror assemblies being part of an MEMS implemented on a substrate, the micro-mirror comprising a first connection structure and a second connection structure, the first connection structure being connected to the substrate at a first pivot point, the second connection structure being connected to the substrate at a second pivot point, the one or more micro-mirror assemblies of the array of micro-mirror assemblies further including a measurement structure connected to the micro-mirror, an electrical resistance of the measurement structure being variable based on a rotation angle of the micro-mirror;
transmitting the first signal to an actuator of the micro-mirror assembly to rotate the micro-mirror by the target rotation angle; and
obtaining, from one or more measurement circuits, measurements of the electrical resistance of the measurement structure of the one or more micro-mirror assemblies to determine a rotation angle of the micro-mirror of the one or more micro-mirror assemblies in response to the first signal.

20. The method of claim 19, further comprising:
determining, for each micro-mirror assembly, a second signal based on the measurements of the electrical resistance; and
transmitting the second signal to the actuator of the respective micro-mirror assembly.

* * * * *